United States Patent [19]
Hyatt

[11] 3,720,992
[45] March 20, 1973

[54] AUTOMATIC PIPE HANDLING SYSTEM

[76] Inventor: John W. Hyatt, 23 Edmund Street, Malden, Mass. 02148

[22] Filed: March 1, 1971

[21] Appl. No.: 119,644

[52] U.S. Cl.....................................29/59, 29/240
[51] Int. Cl..........................B23p 19/00, B23p 19/04
[58] Field of Search............29/430, 429, 240, 200 A

[56] References Cited

UNITED STATES PATENTS

| | | | |
|---|---|---|---|
| 1,765,825 | 6/1930 | Cork | 29/240 |
| 3,174,217 | 3/1965 | Sheppard et al. | 29/240 |
| 3,241,224 | 3/1966 | Banister et al. | 29/429 |

Primary Examiner—Thomas H. Eager
Attorney—A. W. Breiner

[57] ABSTRACT

An automatic machine and control system for automatically cutting elongated pieces of material such as tubes, pipe bar stock and the like, into pieces of predetermined lengths at a first station. Each cut piece is automatically conveyed to a second station where it is clamped and centered with respect to threading and reaming heads which automatically thread and ream both ends of the clamped piece simultaneously. The threaded piece is then released from the clamping means and automatically conveyed to a third station where one of the threaded ends is automatically coated with thread sealing material, following which a fitting is automatically attached to the coated threads. The completed assembly is then automatically conveyed to a storage area. The automatic threading station employs automatically adjustable die heads which automatically compensate for pieces having different diameters with the reaming portion of the die head being automatically adjusted concurrently with the threading portion. The distance between the two die heads of the automatic threading station is automatically adjusted to compensate for varying lengths of pieces to be threaded. The automatic control system and stations can be adapted for operation without any one of the stations, that is, the cutting station can be used in conjunction with the threading station or, the threading station can be used in conjunction with the fitting make-on station without requiring the third station to be incorporated into the system.

59 Claims, 18 Drawing Figures

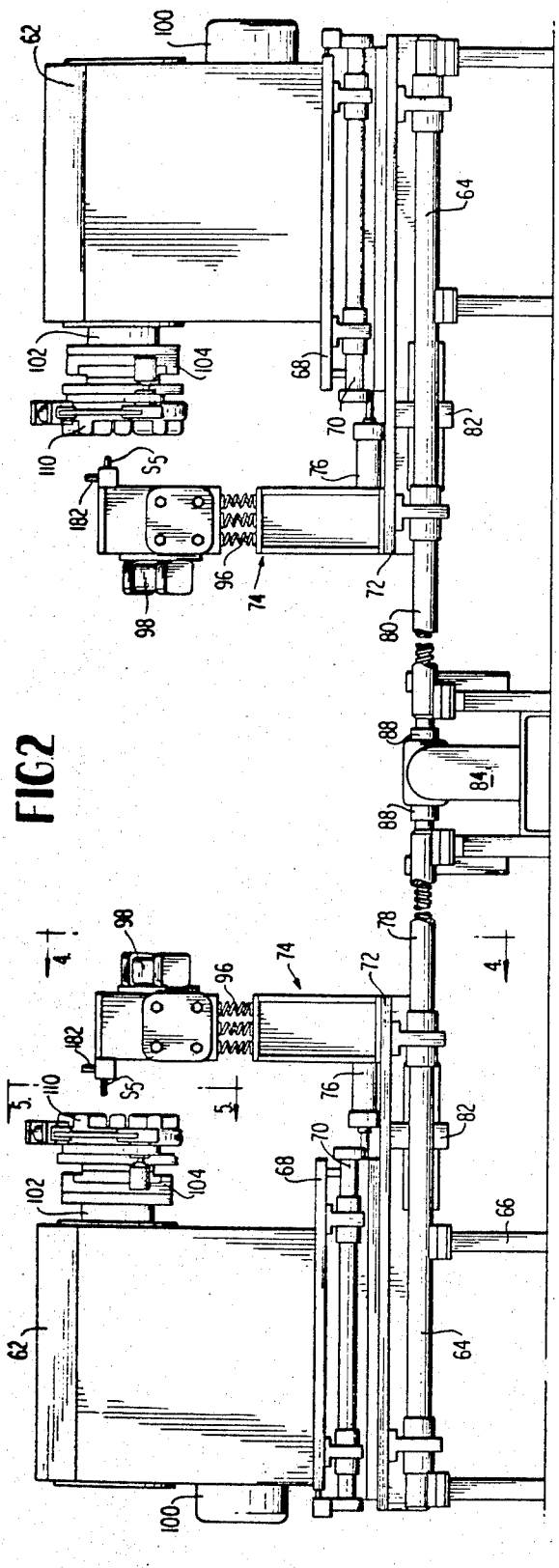
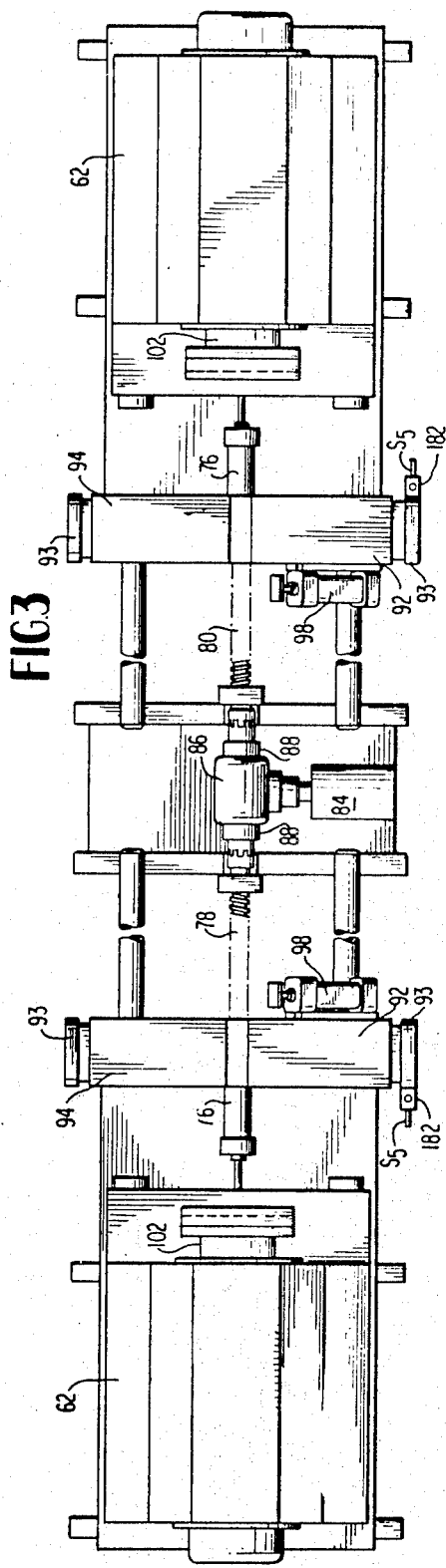
FIG 2
FIG 3

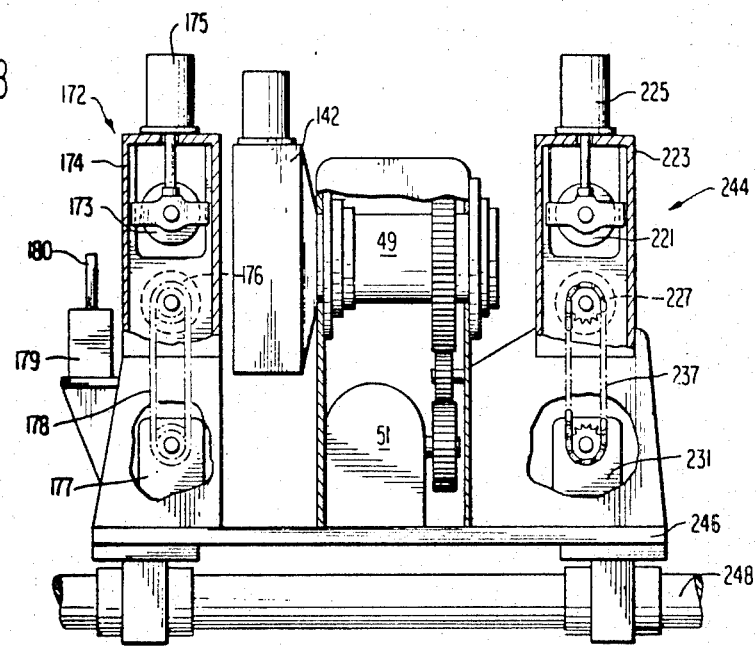
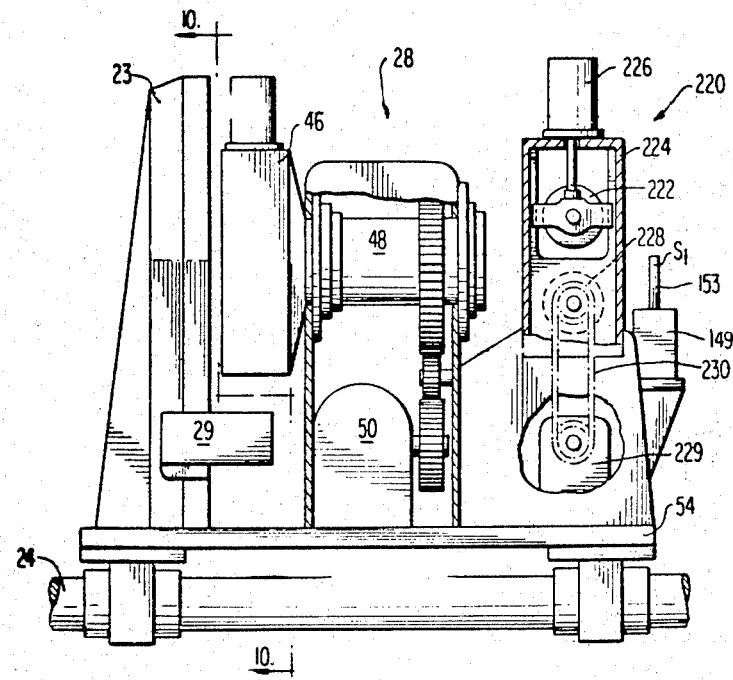

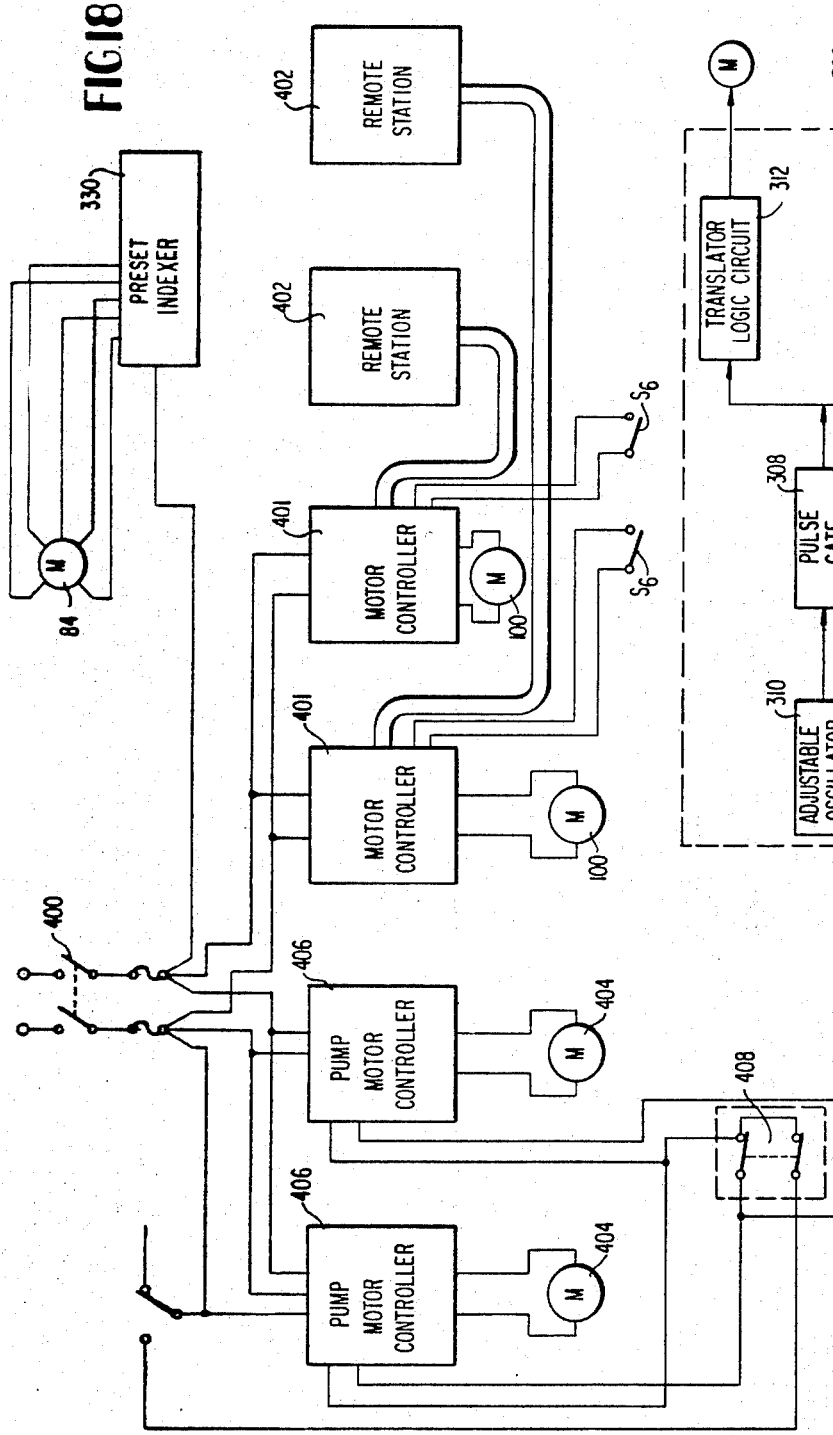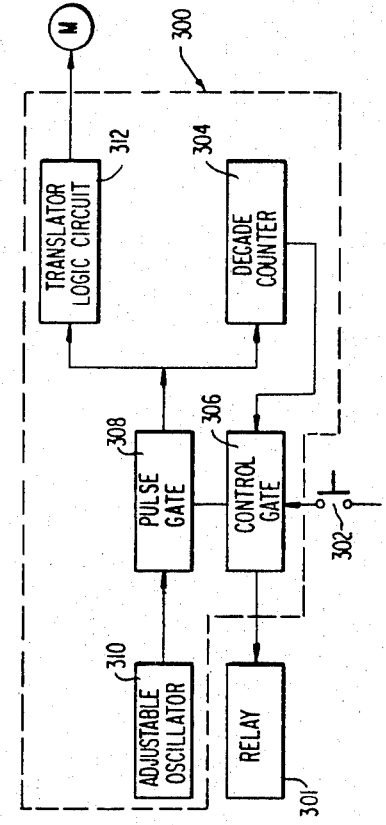

AUTOMATIC PIPE HANDLING SYSTEM

BACKGROUND OF THE INVENTION

1. Field of the Invention

The present invention relates, in general, to an apparatus and method for automatically cutting elongated material such as tubular stock, pipes, bar stock and the like into pieces of pre-determined lengths automatically threading and reaming both ends of a cut piece simultaneously, and automatically attaching a fitting to one end of the threaded piece. The invention also relates to the structural details of the individual components of the apparatus.

2. Description of the Prior Art

It is the practice in the prior art to cut pieces of tubular stock, such as pipe, bar stock and the like, into pieces of pre-determined lengths by manually adjusting and/or operating a cutting machine to obtain the desired lengths. If a threading operation is then to be performed on the cut lengths of stock, each piece is manually placed into a threading machine which threads and reams one end of the piece. The piece is then turned around manually and reinserted into the threading machine for threading and reaming the other end, or else a separate second machine is used to thread and ream the other end. Thus, the prior art practice requires a separate step for either turning the pipe around in the same machine or transferring the pipe to a second machine.

Although the early U.S. Pat. No. 1,804,686 teaches the broad concept of providing an apparatus for simultaneously cutting threads in both ends of a single piece of pipe, the machine is operated manually by a machine operator, rather than by an automatic control system. Furthermore, this cutting process is accomplished by a rotating milling cutter, rather than by a threading die.

Because of the variety of lengths and diameters of pipe required to be cut and threaded, the prior art practices require the handling of the pipe several times during its processing from the cutting step to the final step of attaching a fitting to a threaded end of the pipe. Furthermore, the necessary handling of the pipe is done by hand and/or with the use of various types of handling equipment. The additional handling operations performed either by hand or with the use of mechanical assisting devices have resulted in a rather low level of productivity. This low level of productivity combined with the additional personnel required to carry out the additional handling steps results in a fairly high cost of threaded pipe to the user thereof. Although increasing labor cost has added to the increase of cost of threaded pipe, no automated pipe cutting and threading system has been devised for increasing productivity and quality, while lowering the cost of threaded pipe.

SUMMARY OF THE INVENTION

An object of the invention is to provide an apparatus and method for automatically cutting at a first station an elongated tubular material such as pipe, bar stock, and the like, to pieces of pre-determined lengths, automatically conveying the cut pieces to a second station where each piece is automatically clamped and both ends thereof are simultaneously threaded and reamed automatically, with the threaded piece then being released and automatically conveyed to a third station which automatically coats one of the threaded ends of the piece with thread sealing material and attaches a fitting thereto. The invention also provides a control system for automatically controlling the operation of the apparatus for automatically performing subsequences of operational steps on the material.

A further object of the invention is to provide such an apparatus in which the stations can be operated either as a unit or individually, should any one station become inoperative.

Another object of the invention is to provide a machine for automatically and simultaneously threading both ends of a single piece of elongated material.

Another object of the invention is to provide a control system incorporating sensing means for automatically adjusting the threading machine for accommodating pieces of material having varying lengths and diameters.

A further object of the invention is to provide a new and unique clamping and leveling means for use with an automatic threading apparatus to accommodate bent elongated material.

Another object of the invention is to provide a new and unique threading and reaming die head structure which is automatically adjusted to accommodate pipes of various diameters.

A further object of the invention is to provide new and unique fitting attaching means for use with a pipe fitting make-on station in an automatic apparatus for automatically holding a plurality of fittings and attaching a fitting to the threaded end of a piece of pipe after it has been coated with thread sealing compound.

These and other objects of the present invention will become more apparent from the following description, claims and accompanying drawings.

BRIEF DESCRIPTION OF THE DRAWINGS

FIG. 2 is a side view of the threading machine according to the subject invention, showing the various details thereof;

FIG. 3 is a top view of the threading machine of FIG. 2;

FIG. 8 is a partial section view of the automatic make-on assembly and third conveyor means of FIG. 1;

FIG. 9 is a partial section view of the automatic cut-off drive head assembly of FIG. 1;

FIG. 13 is a section view along line 13—13 of FIG. 1;

FIG. 17 is a schematic layout of one type of preset indexer system used in the present invention; and FIG. 18 is a schematic layout of the motor control system for the automatic clamping and threading machine station of the present invention.

DESCRIPTION OF THE PREFERRED EMBODIMENT

General Overall System

Figure 1:
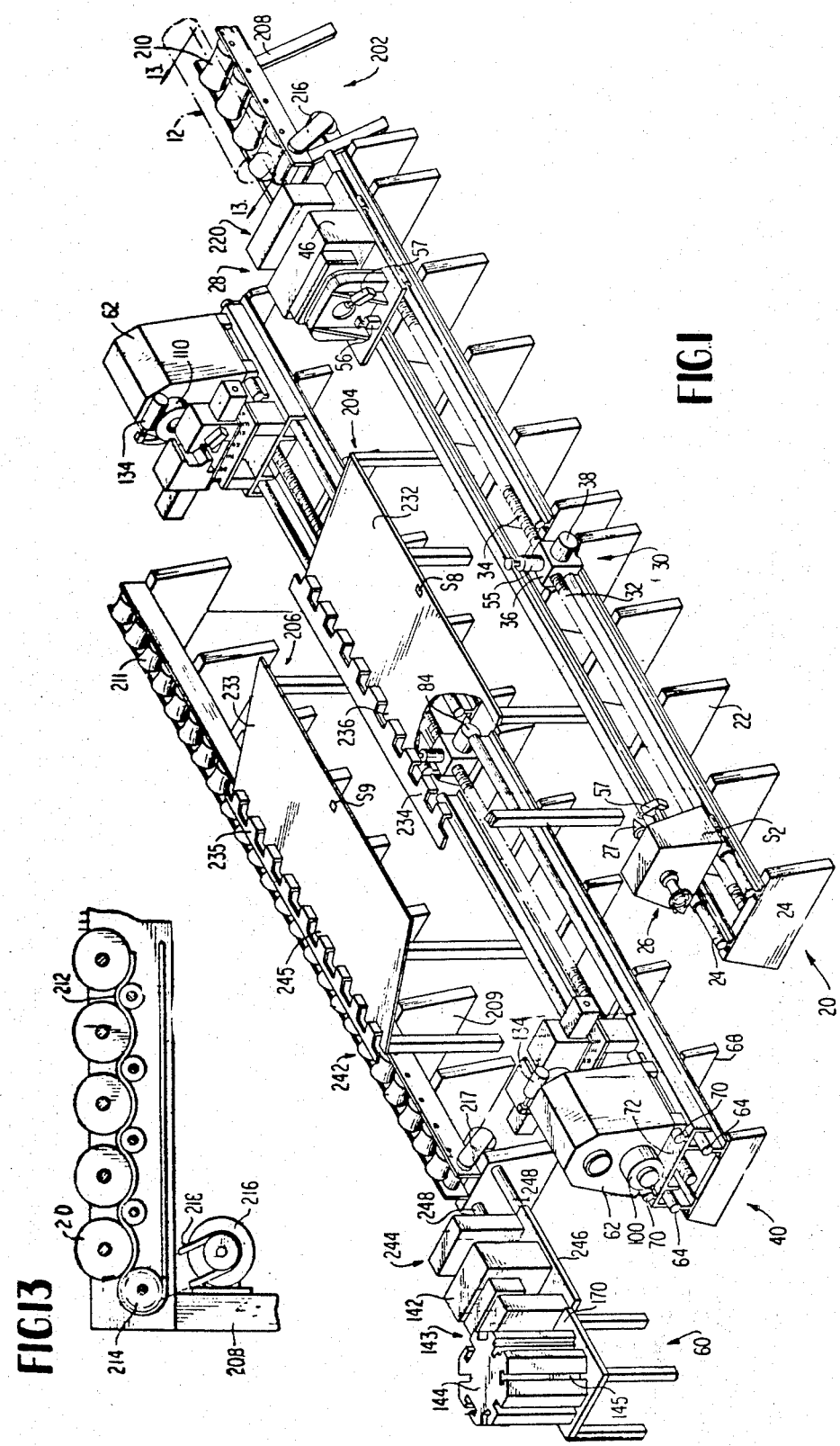
FIG. 1 is a perspective view showing the overall machine and system according to the subject invention.

As shown in FIG. 1, my automatic apparatus for cutting elongated pieces of material into pieces of predetermined lengths and subsequently threading both ends of each cut piece simultaneously and attaching a fitting to one of the threaded ends of the cut piece of material incorporates three automatically controlled machine stations. These three stations include a cut-off machine or station 20, an automatic threading machine or station 40 and an automatic fitting make-on machine or station 60.

An automatic conveying means conveys the material into the cut-off station 20 and then to the other stations for performing the additional operations thereon in a predetermined time sequence of steps which are controlled by the automatic control system, the details of which will be described below. The automatic conveying means consists of a first conveyor section 202 for automatically conveying the pieces of material from a storage rack (not shown) into the cut-off machine 20, a second conveyor section 204 for storing pieces of cut lengths of material and automatically and sequentially conveying a single piece from the cut-off machine 20 to the threading machine 40, where the piece is clamped and both ends are simultaneously threaded, and a third conveyor section 206 for storing pieces of threaded lengths of material and automatically conveying each threaded piece of material into the make-on machine 60, where a fitting is automatically attached to one end of the threaded piece which is then conveyed to a second storage or shipping area (not shown).

Cut-off Machine

The cut-off machine 20 consists of a machine bed or base 22. A pair of hardened and ground ways 24 are mounted parallel to each other on the machine base 22 for maintaining alignment of the various components of the cut-off machine. A material supporting stop assembly 26 and a cut-off and chamfering head assembly 28 are movably mounted on ways 24 in a conventional friction-free manner and are supported thereby for axial movement relative to each other. The supporting stop assembly 26 and cut-off and chamfering unit assembly 28 are moved axially relative to each other by a ball bearing screw drive base 30 which incorporates two screw assemblies 32 and 34 which are driven through a differential gear unit 36 by a single D.C. synchronous stepping motor 38. The motor is controlled by the automatic control system which will be described later.

The two screw assemblies 32 and 34 are operatively connected to the supporting stop assembly 26 and cut-off and chamfering head assembly 28 respectively, by a low friction recirculating ball assembly and are driven by the D.C. synchronous stepping motor 38 to move the supporting stop assembly 26 and cut-off and chamfering head assembly 28 axially relative to each other and position them at any predetermined distance from each other for automatically cutting the material to any corresponding predetermined lengths. The predetermined distance between assemblies 26 and 28 is controlled by the automatic control system which is operatively connected to the D.C. synchronous stepping motor 38.

A center support means, shown in the preferred embodiment as a pneumatically actuated piston and cylinder assembly 55, may be provided at the center of the machine bed 22 of the cut-off machine assembly 20 for supporting the pipe or other material 12, shown in phantom in FIG. 1, being fed into the machine from the first conveyor section 202, until the end of the piece of material 12 engages the supporting stop assembly 26 and is supported thereby. If desired, the piston and cylinder assembly 55 may include a roller mounted thereon on which the pipe 12 to be cut may roll to reduce friction and assist in maintaining alignment with the supporting stop 26.

In the preferred embodiment shown in FIG. 1, the center support means consisting of the pneumatically actuated piston and cylinder assembly 55 may be operatively incorporated into the second conveyor section 204 to be described later, to provide a center support for the pipe 12 being conveyed from the cut-off and chamfering machine station 20 to the threading machine station 40.

The supporting stop assembly 26 may be any preferred type of support for supporting the end of the elongated piece of material 12 to be cut to a predetermined length, depending on the kind of material being cut. In the preferred embodiment shown in FIG. 1, a conical support device 27 is provided for supporting hollow pieces of material, such as pipe or tubular stock. However, the support device 27 could be in the form of a horizontal plate to furnish vertical support for any type of material and could further include vertically upstanding side walls to prevent horizontal movement of the piece of material while the cutting operation is being performed thereon. However, this would be merely a choice of design for one using the assembly according to the present invention.

Figure 10:
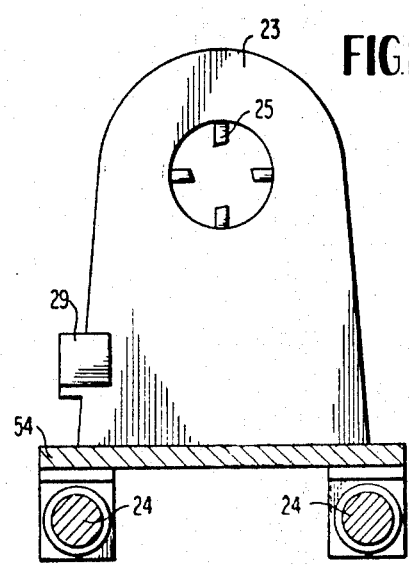
FIG. 10 is an end view of the cut-off mechanism along the line 10—10 of FIG. 9.

FIGS. 9 and 10 show that the cut-off and chamfering head assembly 28 consists of a cut-off section 23 having a plurality of cut-off blades 25 which are mounted for radial movement within the housing of the cut-off section 23. The cut-off blades 25 are mounted within the housing of the cut-off section 23 in such a manner that they are axially offset with respect to each other to permit overlap of the cut-off blades 25 at their innermost positions to permit a complete severing of solid stock as opposed to tubular stock. Each of the cut-off blades 25 has a roller mounted thereon which engages a cam slot in a rotating plate (not shown). The rotating plate is driven by a rotary actuator 29 which may be any desired type of electric motor or other power source operatively connected to the automatic control system. The rotating plate having the cam slots engaging the rollers on the cut-off blades 25 for radially adjusting the blades 25 has a gear cut on its outside diameter which engages a worm gear operatively connected to the rotary actuator 29 for rotating the cam plate and moving the cut-off blades 25 radially inwardly as the cutting progresses. The rotary actuator 29 is reversed after a cut has been completed to move the cut-off blades 25 radially outwardly to be in position to start another cut-off and chamfering operation. Alternatively, a single cut-off blade 25 could be used to perform the cutting operation, if so desired.

The cut-off and chamfering head assembly 28 further consists of a clamping and centering jaw assembly 46 for clamping and rotating the pipe or elongated material 12 which is to be cut to a desired length. The clamping and centering jaw assembly 46 incorporates a plurality of pneumatically actuated radially movable clamping jaws for engaging the piece of elongated material 12. The radially movable clamping jaws are drivingly connected to a spindle 48 which is driven by a gear motor 50 through a gear train 52. The rotating spindle 48 also has rotating pneumatic connections to supply pneumatic pressure to the clamping jaws to obtain a positive clamping force on the material and the control thereof at all times.

As shown in FIG. 9, the cut-off section 23, the clamping and centering jaw assembly 46 and the spindle 48, motor 50 and gear drive 52, are mounted on a single support plate or table 54 for movement together along the ground ways 24. The structure for movably supporting the support table 54 on the ways 24 may be by any known low friction assembly or mounting device.

Referring now to FIG. 1, pneumatically operated piston and cylinder assemblies 56 are mounted vertically on the support plate 54 of the cut-off and chamfering head assembly 28 and on the material supporting stop assembly 26 below the area where the elongated piece of material 12 will be positioned. The pneumatically operated piston and cylinder assemblies 56 are operatively connected with the automatic control system of the subject invention for assisting the center material support means, shown as the piston and cylinder assembly 55, and for ejecting the piece of material from the cut-off machine 20 onto the second conveyor section 204 after the cutting operation has been performed.

In conjunction with the pneumatically operated piston and cylinder assemblies 56, a second set of pneumatically operated piston and cylinder assemblies 57 are mounted at an inclined angle on both the material supporting stop assembly 26 and the cut-off and chamfering head assembly 28 for movement therewith, as shown in FIG. 1. The piston and cylinder assemblies 57 are mounted at an angle with the top portion inclined in the direction of the automatic cut-off and chamfering assembly 40, as may be seen in FIG. 1. The piston and cylinder assemblies 57 are operatively connected to a source of pneumatic pressure and with the automatic control system and, along with the piston and cylinder assemblies 56, form a portion of the second conveyor section 204, the operation of which will be described in detail below. The sequence of operation of the pneumatic piston and cylinder assemblies 55, 56 and 57 in conjunction with the cut-off operation will be described in detail when the automatic control system of the subject invention is described.

Automatic Clamping, Leveling and Threading Machine

As shown in FIG. 1, the automatic clamping, leveling and threading machine assembly 40 is positioned adjacent the automatic cut-off machine assembly 20. The automatic clamping, leveling and threading machine assembly 40 consists of two independently driven power head units 62 movably supported for movement axially relative to each other on a set of hardened and ground ways 64 which are supported on a machine bed 66 in a conventional machine construction. Note that it is possible to mount each power head unit 62 on a separate machine base 66 and set of hardened and ground ways 64 to obtain greater distances between the power head units 62, as long as axial alignment is maintained between the ways 64 on which each power head unit 62 is mounted.

Referring now to FIG. 2, each of the power head units 62 is supported by a support base or plate 68 which is movably mounted on a second set of hardened and ground ways 70 which are positioned parallel to the first set of ways 64. The second set of ways 70 are, in turn, mounted on a second support base or plate 72 which is movably mounted on and supported by the first set of ways 64.

Mounted adjacent each power head unit 62 is an automatic clamping and leveling means 74 which is controlled by the automatic control system as described below. The automatic clamping and leveling means 74 is mounted on the second support base or plate 72 and is movable therewith on the first set of guide ways 64. An actuating means is provided to move the support base or plate 68 on which the power head unit 62 is mounted relative to the automatic clamping and leveling means 74 on the second set of ways 70. In the preferred embodiment, such an actuating means includes pneumatically actuated piston and cylinder assemblies 76 operatively connected between a point on the second support base or plate 72 and the support base or plate 68 on which the power head unit 62 is mounted. The pneumatically actuated piston and cylinder assemblies 76 are operatively connected to and controlled by the automatic control system, as will be described below, to enable the power head unit 62 to be moved axially away from the end of the piece of material following the completion of the threading operation, so that the threaded piece of material may be ejected from the clamping means 50 and automatically conveyed to the make-on assembly 60.

As shown in FIGS. 2 and 3, the support base plates 72 on which the power head units 62 and automatic clamping and leveling means 74 are mounted are moved axially relative to each other by two screw mechanisms 78 and 80 operatively connected with the second support bases 72 through low friction recirculating ball units 82. The screw portions of the screw mechanisms 78 are driven by a single D.C. synchronous stepping motor 84 through a differential drive unit 86. The D.C. synchronous stepping motor 84 is operatively connected to and controlled by the automatic control system of the subject invention in response to sensing means to move the power head units 62 and automatic clamping and leveling means 74 axially in and out to automatically compensate for varying lengths of pipe or cut material in a manner to be described below.

An automatically controlled electric clutch 88 is drivingly connected between the differential drive unit 86 and each of the drive screws of the screw mechanisms 78 and 80. The electric clutches 88 are operatively connected to the automatic control system to selectively engage or disengage either of the two ball screw mechanisms in response to sensors which sense the presence of the end of a piece of cut material. Either of the two ends of the threading machine 40 may thus be selectively moved axially relative to the other to compensate for varying positioning of the cut material after the cut piece has been conveyed from the cut-off machine station 20 to the automatic threading machine station 40. The complete operation of this portion of the threading machine station and controls therefor will be described below in the description of the automatic control system.

The independent drives for each of the power head units 62 consists of separate electric motors, for example, Morse 3 horsepower D.C. motors, shown at 100, coupled to output spindles 102 through double reduction helical gear trains contained within the housings of the power head units 62 to obtain a positive drive at all times. The output spindles 102 are supported by means of bearings in a conventional manner to provide the required strength and rigidity necessary to obtain accurate results in the operation of the machine. Each of the drive motors 100 is operatively connected with a motor speed controller 400, shown in FIG. 18, which is incorporated into the automatic control system for obtaining the desired output speed of the spindles 102 in response to the automatic control system, as will be described in detail below.

Attached to the end of the output spindles 102 are mounting flanges 104 for drivingly attaching automatic threading die head assemblies 110 or any other desired tool elements to the spindles 102 for performing a threading or other desired machining operation simultaneously on both ends of a piece of material. The mounting flanges 104 may be of any type that is commercially available or well known in the machine tool art.

Figure 4:
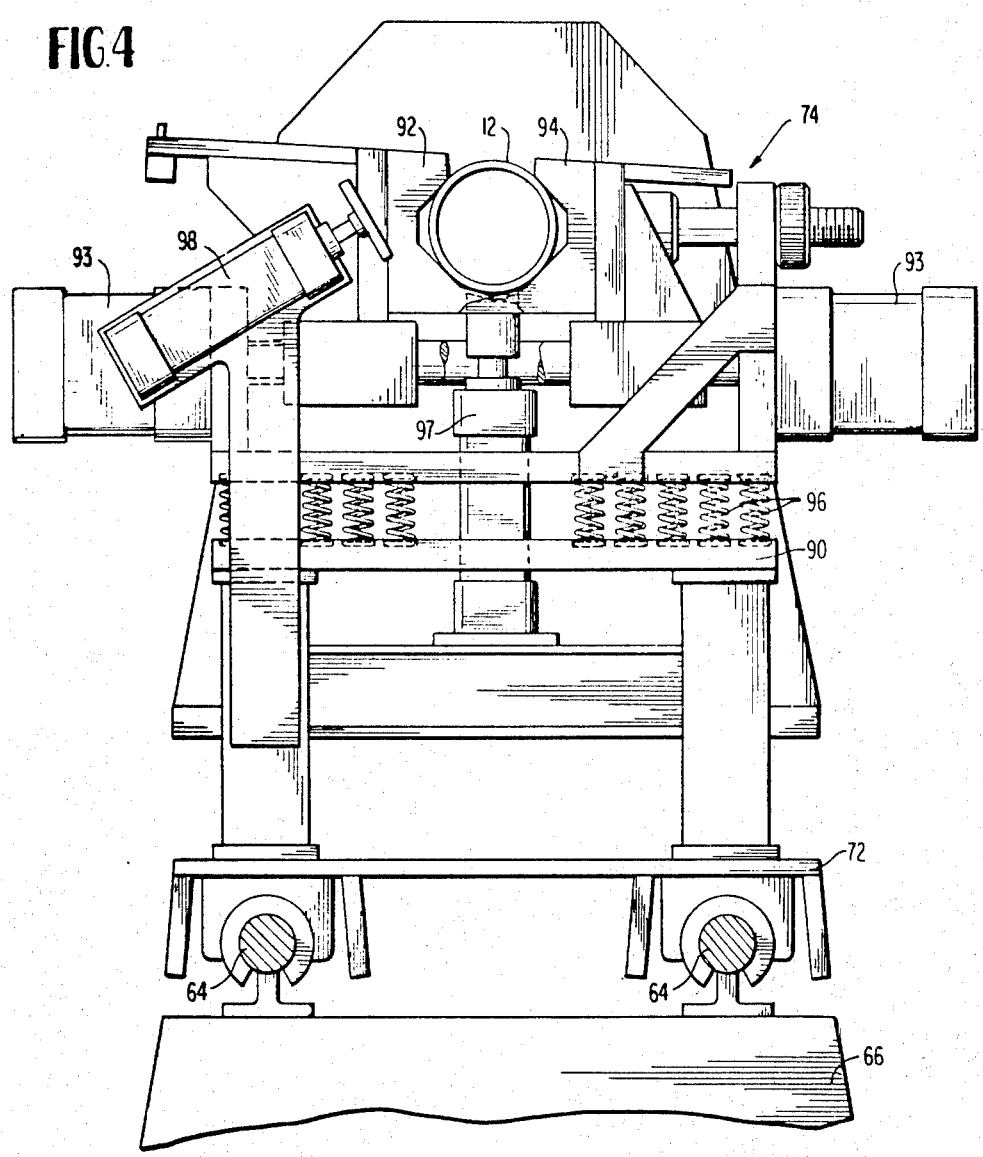
FIG. 4 is a view taken along the line 4—4 of FIG. 2, showing the details of the clamping and leveling means according to the present invention.

Referring now to FIG. 4, the automatic clamping and leveling means 74 consists of a support base member 90 rigidly mounted on the second support base plate 72 for supporting a pair of horizontally opposed clamping jaws 92 and 94.

The clamping jaws 92 and 94 are sufficiently wide enough for a single set of jaws at one end of the threading and reaming machine 40 to provide sufficient support and clamping force on a short length of material, in case only a single end of a short piece of material is to be threaded. The clamping surfaces of the jaws 92 and 94 may be grooved or serrated if desired to assist in preventing rotation of a piece of material while a threading or other machining operation is being performed thereon. By constructing the clamping jaws in this manner, any desired type of threads may be put on either end to the length of material simultaneously. For example, right or left-hand threads may be put on both ends of a single piece, or right-hand threads may be cut on one end while left-hand threads are being cut simultaneously on the other end.

The clamping jaws 92 and 94 are floatingly supported on support base member 90 by any desired means, such as a liquid suspension means or by a plurality of springs 96 as shown in the preferred embodiment in FIGS. 2 and 4. The floating support of the clamping jaws 92 and 94 enables the jaws to clamp a piece of elongated material and center the ends of the piece of material relative to the centerline of the spindles 102 and the automatic threading die head assembly 110 attached thereto. Should the piece of elongated material which is to be threaded be slightly bent or curved, the floating support will compensate for the bend in the material by allowing the clamping jaws 92 and 94 to move slightly so that they will fully engage the piece of bent material and to maintain the alignment with the spindle and threading die head 110.

Each of the clamping jaws 92 and 94 are operatively connected to and actuated by a pneumatic piston and cylinder assembly 93. The piston and cylinder assemblies 93 are, in turn, operatively connected with a source of air pressure, with the supply to the piston and cylinder assemblies 93 being controlled by the automatic control system of the present invention to automatically clamp the piece of material 12 to be threaded between the jaws 92 and 94 and to release the jaws in a predetermined operational sequence as will be discussed hereinafter.

As shown in FIGS. 2 and 4, two additional pneumatic piston and cylinder assemblies are mounted on each of the automatic clamping and leveling means 74. One of the pneumatic piston and cylinder assemblies 97 is positioned vertically below the clamping jaws 92 and 94 for supporting a piece of cut material 12 as it is being conveyed into the clamping jaws 92 and 94 and prior to the application of the clamping jaws 92 and 94 thereto and for raising the threaded piece out of the jaws 92 and 94 following the release thereof. The pneumatic piston and cylinder assemblies 97 are operatively connected to a source of pneumatic pressure and with the automatic control system of the present invention and are automatically extended following release of the clamping jaws 92 and 94 to raise the piece of material 12 above the top of the clamping jaws 92 and 94 following the threading operation. The second pneumatic piston and cylinder assemblies 98 are mounted adjacent the clamping jaws 92 at an inclined angle directed toward the make-on machine assembly 60, as seen in FIG. 3 and 4, and are operatively connected to a source of pneumatic pressure and with the automatic control system of the present invention. When actuated, the piston and cylinder assemblies 98 are extended and engage the raised piece of material 12 to cause the piece to roll down the inclined top surface of the clamping jaw 94 to the automatic make-on machine assembly 60. The complete operation of the pneumatic piston and cylinder assemblies which are incorporated into the third conveyor section 206 will be described in detail below. Note that the top surfaces of both clamping jaws 92 and 94 are inclined at a slight angle downwardly in the direction of the automatic fitting make-on station 60 to enable the material to be conveyed from the second conveyor section 204 of the automatic conveyor means positioned between the cut-off machine assembly 20 and the automatic clamping, leveling and threading machine assembly 40 into the clamping jaws 92 and 94, where the material is then automatically clamped for the desired operation to be performed thereon and from the clamping jaws 92 and 94 onto the third conveyor section 206.

Figure 5:
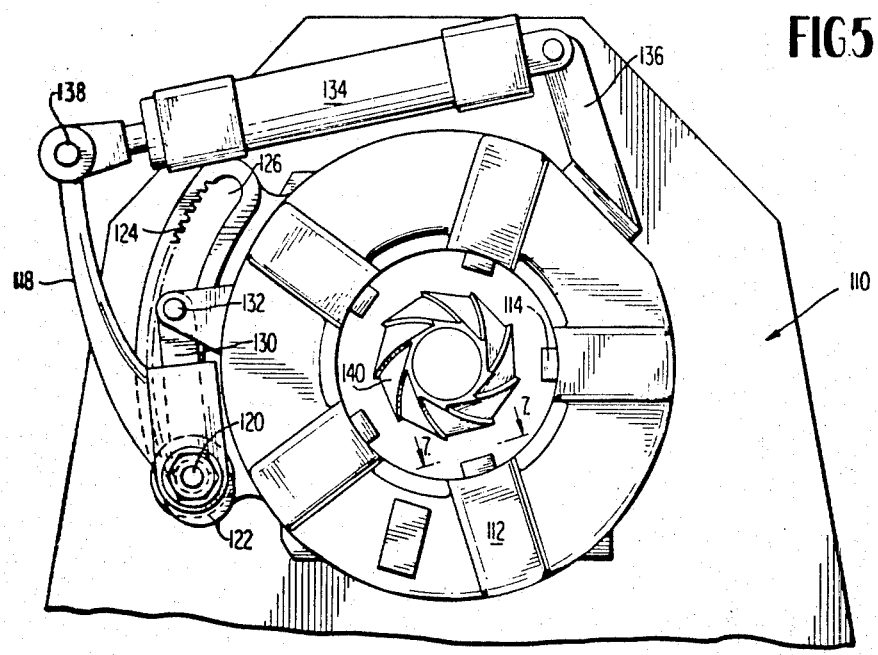
FIG. 5 is an end view of the automatically adjustable threading and reaming assembly taken along line 5—5 of FIG. 2.
Figure 6:
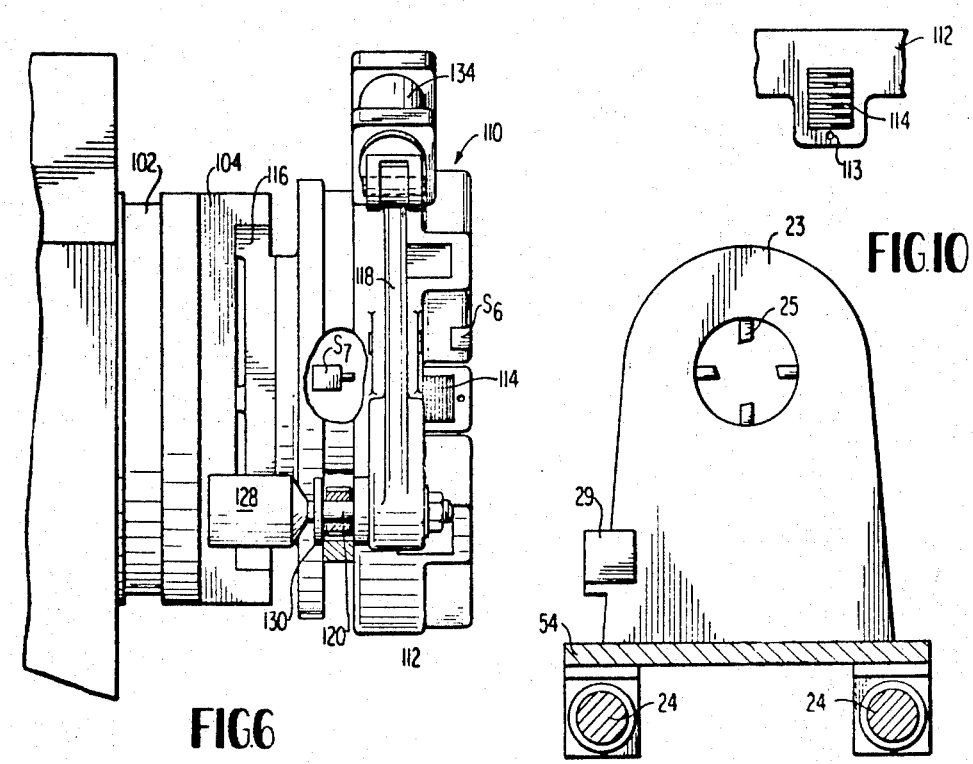
FIG. 6 is a side view of the automatically adjustable threading and reaming assembly of FIG. 5.
Figure 7:
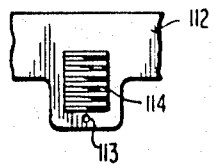
FIG. 7 is an end view of the threading dies taken along line 7—7 of FIG. 5.

The automatically adjustable die head assemblies 110, shown in detail in FIGS. 6 and 7 consist of a housing member 112 for retaining a plurality of radially movable threading dies 114. The housing 112 is constructed with a mounting flange 116 for attachment to the mounting flanges 104 on the end of output spindles 102 to obtain a driving connection between the spindles 102 and the die head assemblies 110. The mounting flanges 116 may be constructed in such a manner to allow the die head assemblies 110 to "float" to compensate for slight irregularities in the position and alignment of the pipe ends. The automatically adjustable die head assemblies 110 incorporate a conventional die adjusting linkage within the housing 112 such as is employed in commercially available manually adjustable die head assemblies, for example, adjustable die head assemblies manufactured and sold by Oster and other manufacturers. The internal linkage for radially adjusting the threading dies 114 is operatively connected with an external pivotable arm 118 for opening the dies 114 to the point of maximum retraction for removing the die head assemblies 110 from the threaded end of the pipe by pivoting the arm 118 in a counterclockwise direction, as seen in FIG. 5. By pivoting the arm 118 in a clockwise direction, the threading dies 114 are moved radially inwardly to their predetermined set diameter, which is determined by the positioning of a shaft 120 in an arcuate opening 126.

The shaft 120 has a gear 122 operatively connected to one end. The gear 122 is engageable with gear teeth 124 formed in the opening 126. The shaft 120 has its remaining end operatively connected with a D.C. synchronous stepping motor 128 mounted on the back side of the housing 112. The small D.C. synchronous stepping motor 128 is operatively connected with and controlled by the automatic control system to automatically adjust the threading dies 114 to predetermined dimensions. The shaft 120 passes through an opening in an adjusting lever arm 130, which is operatively connected with the internal die positioning linkage at 132. By rotating shaft 120 with the D.C. synchronous stepping motor 128, the gear 122 engages the gear teeth 124 and moves along the arcuate opening 126 to cause the internal die positioning linkage to be positioned at predetermined points to set the radially movable threading dies 114 at the required diameter in response to diameter sensing devices, the operation of which will be discussed below, to perform threading operations on material of different cross-sectional dimensions. The positioning of the shaft 120 and, in turn, the internal die positioning linkage, is commonly performed manually, thus obtaining only a single preset dimension for material which can be threaded.

The external pivotable arm 118 is moved about its pivot point to open and close the threading dies 114 by means of a pneumatically actuated piston and cylinder assembly 134 having one end pivotally secured to the housing member 112 of the automatically adjustable die head assembly 110 by means of a bracket 136 attached thereto. The other end of the pneumatically actuated piston and cylinder assembly 134 is pivotally connected with the swingable end of the external pivotable arm 118 at 138. The pneumatically actuated piston and cylinder assembly is operatively connected with a source of pneumatic pressure and is controlled by the automatic control system of the present invention to be extended to pivot arm 118 in a counterclockwise direction to open the movable threading dies to their maximum position for removing the die head assembly 110 from the threaded portion of a piece of material and to be retracted to swing the arm 118 in a clockwise direction to a preset position, the preset position determined by the position of the gear 122 and shaft 120 in the slot or opening 126. The preset position of the gear 122 is obtained by stepping the D.C. synchronous motor 128 by the automatic control system. The position of the shaft 120 and gear 122 is determined by a diameter sensing means operatively connected with the automatic control system. Thus it can be seen that the automatic die head assembly construction 110 according to the present invention can be automatically adjusted to compensate for various diameters of pipes or other stock to be threaded without requiring a manual adjustment of the die head to compensate for various diameters of material, as is required with conventional threading die assemblies.

As shown in FIG. 7, the housing member 112 of the automatically adjustable die head assembly 110 is provided with a plurality of spray nozzles 113 located around the interior of the opening into which the threading dies 114 project. It is preferred that there be one nozzle 113 corresponding to each of the threading dies 114, with the nozzles 113 being positioned on the front face of the housing member, as seen in FIG. 7. Each of the nozzles 113 are communicated with an internal fluid supply passage formed within the housing member 112, with the internal fluid passage within housing member 112, in turn, being connected with a cutting fluid supply source by way of a rotating fluid connection between the stationary portion of the power head unit 62 and the rotating spindle 102, by any desired conventional and well-known rotating fluid connection means. By employing cutting fluid and coolant spray nozzle 113 positioned adjacent each threading die 114, a spray of the cutting fluid and coolant is directed onto the member being threaded in the immediate vicinity of each threading die 114, and the heat created by the threading operation is conducted away from the end of the material more efficiently and better lubrication for the threading dies is obtained. Also, the chips resulting from the threading operation are completely washed away from the threading area. The liquid cooling and lubricating solution containing the threading chips then falls into a pan or other container placed below the spindle and threading dies in a conventional manner for collecting the fluid and chips. The chips may be removed by means of any conventional and well-known conveying means incorporated into the pan or solution recovery device.

In addition to performing an automatic simultaneous threading of both ends of a single piece of elongated material, the automatic threading and reaming machine assembly 40 is provided with a tapered reamer 140, shown in FIG. 5, for reaming the inside edge of the end of a tubular piece of material being threaded, if so desired. The reamer 140 is of a tapered construction to accommodate tubular pieces having various inside diameters. The output spindles 102 and/or mounting flanges 104 attached thereto are provided with a chuck or socket device for drivingly retaining the reamer 140 so that the reamer is positioned within the opening through the housing 112 of the automatically adjustable die head assembly 110 to engage the inner edge of the piece of tubular material being threaded and ream the edge the desired amount during the cutting operation of the last few threads on the pipe. By providing such a chuck or retaining device, the reamer 140 is driven in conjunction with the automatically adjustable die head assembly 110 by the spindle 102, thereby eliminating the requirement of a separate drive source for the reamer and to enable the threading and reaming operation to be carried out simultaneously, thus eliminating any additional time required to perform a subsequent reaming operation.

Although the automatic clamping and threading machine station 40 has been described above for performing an automatic threading operation in combination with an automatic cut-off machine assembly and an automatic fitting make-on assembly, it would be obvious to one skilled in the art that the automatic machine assembly 40 could be operated independently to perform any desired type of machining operation by adapting the desired machine tool to the mounting flanges 104 or drive spindles 102 of the power head units 62 and performing the desired machining operation.

Furthermore, since each of the power head units 62 is powered independently of each other, different machining operations may be carried out simultaneously on each end of a single piece of material, or only a single power head unit 62 may be used to carry out a machining operation on only a single end of a piece of material.

Automatic Make-On Machine

The automatic make-on machine assembly 60, shown in FIGS. 1 and 8, consists of a pipe clamping and centering assembly 142 and an automatic fitting feeding and clamping head assembly 143. The pipe clamping and centering assembly 142 of the automatic make-on machine assembly 60 is of the same construction as the clamping and centering jaw assembly 46 employed in the automatic cut-off machine 20 and operates in the same manner, so the same constructional and operational description will apply with the exception that the gear motor 51 of the automatic make-on machine assembly 60, shown in FIG. 8, incorporates a torque sensing clutch to disengage the spindle drive 49 when a predetermined torque is reached when threading the pipe into a fitting, at which time a signal is sent to the automatic control system to disengage the clamping jaws of the clamping assembly 142.

In addition to the clamping and centering assembly 142, the fitting feeding and clamping head assembly 143 includes a turret type feeding hopper 144. The feeding hopper 144 has a plurality of sides with slots 145 formed therealong, the cross-sectional configuration of each slot 145 corresponding to the shape of the fittings contained therein to maintain proper alignment of the fittings as they are fed into the make-on machine. The number of sides and slots on the fitting feeder hopper 144 corresponds to the number of different sizes and shapes of fittings to be fed into the clamping head, as best seen in FIG. 1.

The feeding hopper 144 is rotatably mounted adjacent the fitting clamping head assembly 143 and is rotated by a D.C. synchronous stepping motor (not shown), which is operatively connected with the automatic control system of the subject invention to automatically position the desired fitting to be fed into the fitting clamping head assembly 143. The fittings are fed by gravity downwardly in the slots 145 as the lowermost fitting is attached to a piece of threaded material. The feeding hopper 144 is supported on a bottom plate 170, which has a single opening therein to allow fittings to drop down into the fitting clamp of the clamping head assembly 143. An automatically actuated closure device (not shown) operates in conjunction with the opening in the bottom plate 170 to allow only a single fitting to pass through the opening and to block the opening so that the feeding hopper 144 may be indexed to the desired position.

Positioned adjacent the point where the pipe is rotated and threaded into the fitting is a pressurized source of pipe thread dope for coating the pipe threads prior to their being threaded into the fitting. The pipe dope may be applied under pressure to the pipe threads from a nozzle or supplied under pressure to a brush which contacts the threads on the pipe and coats the threads while the pipe is being rotated by the clamping assembly 142.

Referring now to FIG. 8, the automatic make-on machine assembly 60 further incorporates a feed roll drive assembly 172 to convey the pipe into the automatic fitting feeding and clamping head assembly 143 and out of the make-on machine assembly 60 once the fitting has been attached to the pipe. The feed roll drive assembly 172 includes an upper roller 173 movably mounted on the frame portion 174 of the feed drive roller assembly 172. The upper roller 173 is attached to a pneumatic piston and cylinder assembly 175. The pneumatic piston and cylinder assembly 175 is connected with a source of pneumatic pressure and is controlled by the automatic control system of the present invention in a manner described below, to move roller 173 up or down for frictionally engaging or disengaging the roller 173 with a piece of pipe. A lower roller 176 is rotatingly mounted on the frame portion 174 of the feed drive roller assembly 172 and is drivingly connected to a power source, such as a motor 177, by means of a belt drive 178. The drive motor 177 is operatively connected with the automatic control system of the present invention to be actuated thereby when the chuck assembly 142 releases its grip on the completed piece of pipe 12, at which time, the rollers 173 and 176 frictionally engage the piece of pipe and convey the piece in a longitudinal direction out of the fitting make-on machine 60 to a storage rack or area (not shown).

A reciprocable pipe stop assembly 179, having a pneumatically actuated reciprocable member 180 is mounted on the frame portion 174 of the feed drive roller assembly 172 for controlling the feed drive roller assembly 172. A micro switch is mounted on the reciprocable member 180 and is operatively connected to the automatic control system of the present invention. When the reciprocating member 180 is in the extended position, the micro switch mounted thereon senses the end of a piece of pipe and sends a signal to the automatic control system to cause the pneumatic cylinders 175 to be actuated to raise the roller 176 and simultaneously disengage the electric motor 177. The automatic control system also causes the pipe stop 180 to be lowered so that the threaded piece of pipe can be rotated into a fitting.

The entire carriage and platform 246 of the make-on machine 60 is allowed to advance toward the fitting containing turret 144 and fitting feeding and clamping head assembly 143 by moving on the ways 248.

Automatic Conveying Means

The automatic conveying means is made up of three separate sections, the first conveyor section 202 for conveying pipe into the cut-off machine assembly 20, the second conveyor section 204 including a means for automatically ejecting the pieces of cut pipe out of the automatic cut-off machine assembly 20 and for conveying the cut pieces of pipe from the automatic cut-off assembly 20 to the automatic threading machine assembly 40, and the third conveyor section 206 for automatically ejecting the threaded pieces of pipe out of the clamping means 74 and conveying the pieces of threaded pipe from the automatic threading machine assembly 40 to the automatic fitting make-on machine assembly 60.

Referring now to FIGS. 1 and 13, the first conveyor section 202 includes a support base or frame member 208 having a plurality of rollers 210 rotatingly mounted thereon for supporting a piece of elongated material 12 for longitudinal movement into the clamping and centering jaw assembly 46 of the automatic cut-off machine assembly 20. FIG. 13 shows a section view of a portion of the first conveyor section 202 for conveying cut and threaded pieces of pipe into the automatic make-on machine section 60.

The conveying rollers 210 are driven by a conveyor belt 212 sandwiched between the conveying rollers 210 and a plurality of idler rollers 214 mounted on support base member 208 and driven by a variable speed electric motor 216 through a belt drive 218 connected to one of the idler rollers 214. The motor 216 operates at all times to maintain a continuous supply of material into the cut-off machine assembly 20.

Referring now to FIG. 9, an automatic feed roller assembly 220 is mounted on the support plate 54 of the automatic cut-off machine assembly 20 and includes an upper roller 222 movably mounted on the frame portion 224 of the automatic feed roll assembly 220 and connected to two pneumatic piston and cylinder assemblies 226. The pneumatic piston and cylinder 226 are operatively connected with a pneumatic pressure source and with the automatic control system of the present invention for actuating the piston and cylinder assemblies 226. A second roller 228 is rotatingly mounted on the frame portion 224 and is rotated by a power source, such as an electric motor 229 drivingly connected to roller 228 through a belt 230 and electric clutch or other similar driving mechanism, such as gears, etc. The electric motor 229 is operatively connected to the control system of the subject invention and is energized thereby in response to a predetermined signal for feeding pipe or other elongated material into the clamping and centering jaw assembly 46 of the cut-off machine assembly 20. When the predetermined length has been fed into the cut-off machine 20, the electric motor 229 is de-energized and the clamping jaws 46 are actuated to clamp the pipe for initiating the cut-off step.

Although the automatic feed roll assembly 220 of the first conveying section 202 is shown as being mounted on the support plate 54 of the automatic cut-off machine for travel with the cut-off and chamfering head assembly 28, it is obvious that the automatic feed roll assembly 220 could be mounted on the support base member 208 of the first conveyor section 202.

Figures 11, 12:
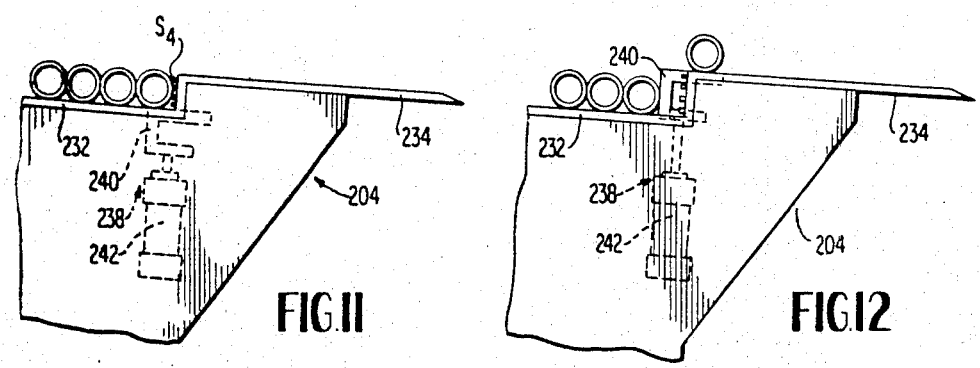
FIG. 11 is a section view of a portion of the second and third conveyor means showing the reciprocating mechanism in the retracted position.
FIG. 12 is the same as FIG. 11, but showing the reciprocating mechanism in the extended position and conveying a piece of material.

As seen in FIGS. 1, 10 and 11, the second conveyor section 204 of the automatic conveying means 200 includes a first inclined table section 232 and a second inclined table section 234, the first inclined table section 232 having one end positioned at a height generally corresponding to the longitudinal axis of the cut-off machine head assembly 28 and material supporting stop assembly 26 and generally adjacent thereto. The first inclined table section 232 inclines slightly downwardly in the direction of the automatic clamping and threading machine assembly 40. The second inclined table section 234 has one edge thereof positioned adjacent to and slightly higher than the lowermost edge of the first inclined table section 232, as shown in FIGS. 10 and 11. The second inclined table section 234 inclines downwardly in the direction of the automatic clamping and threading machine assembly 40, with its lowermost edge terminating adjacent to and at the same level as the outermost edge of the upper surface of clamping jaws 92 of the clamping means 74. The lower edge of the second table section 234 may overlap the outermost edge of the upper surface of the clamping jaws 92, if so desired. The upper surface of the clamping jaws 92 extends outwardly beyond the sides of the power head units 62, as shown in FIG. 4, to permit the power head units 62 to travel alongside the second inclined table section 234.

A plurality of aligned slots 236 are cut in the adjacent edges of the first and second inclined table sections 232 and 234, as shown in FIG. 1. A reciprocating stop and ejector device 238, comprised of an angled member 240 is mounted for reciprocation in at least two of the slots 236. The construction of the reciprocating devices 238 is shown in FIGS. 11 and 12. Although it is preferred to use at least two of the reciprocating stop and ejector devices 238 in a spaced apart relationship, any desired number may be used, depending upon the weight and length of material to be conveyed from the first inclined table section 232 to the second inclined table section 234 and to the automatic clamping and threading machine assembly 40.

The reciprocating stop and ejector devices 238 are powered by pneumatic piston and cylinder assemblies 242, which are operatively connected to a source of pneumatic pressure and controlled by the automatic control system to raise a single piece of stock material from the first inclined table section 232 onto the second inclined table section 234, where the single piece of stock will roll or slide down the incline onto the top surface of the clamping jaws 92 and into the clamping jaws 92 and 94 of the automatic clamping and threading machine assembly 40. If desired, the first and second inclined table sections 232 and 234 may be constructed in telescopic sections and movably mounted on roller supports or similar means to move in and out, depending upon the positions of the power head units 62 of the automatic clamping, leveling and threading machine assembly 40. If the first and second inclined table sections 160 and 162 are constructed in this manner, a plurality of reciprocating stop and ejector devices 238 should be used to compensate for various lengths of elongated material to be conveyed. For the most part, however, it is satisfactory to construct the first and second inclined table sections 232 and 234 of a fixed length and to position the reciprocating ejector devices 238 apart from each other a distance slightly less than the length of the shortest piece of material to be threaded, with additional reciprocating stop and ejector devices 238 located near each end of the table sections to provide adequate support for longer lengths of cut pieces of material while still providing a satisfactory lifting and conveying means for shorter lengths of cut material.

In addition to the first and second inclined table sections 232 and 234 and the reciprocating stop and ejector devices 238, with their actuating piston and cylinder assemblies 242, the second automatic conveying section 204 also includes the two sets of pneumatically operated piston and cylinder assemblies 56 and 57 mounted on the automatic cut-off and chamfering machine assembly 20. As described previously, the first set of air cylinder assemblies 56 are mounted vertically on the material support stop assembly 26 and on the cut-off head assembly 28 and aligned with the centerline of the automatic cut-off machine assembly. The pneumatic piston and cylinder assemblies 56 are operatively connected with a source of pneumatic pressure and the automatic control system for the subject invention and are actuated in response thereto to furnish support for a piece of material in conjunction with the center support device 55 while the material is being conveyed into the machine for a cut-off operation to be performed thereon and to support the cut length of pipe after the cut-off operation has been completed and the supporting stop assembly 26 and cut-off head unit assembly 28 have been moved away from the cut length. The pneumatic piston and cylinder assemblies 56, and 55 if desired, are actuated to raise the cut length of material to the height of the adjacent edge of the first inclined table section 232.

The second set of pneumatic piston and cylinder assemblies 57, mounted on the supporting stop assembly 26 and on the cut-off and chamfering unit head assembly 28 in an inclined manner, as described above, are also operatively connected to a source of pneumatic pressure and with the automatic control system of the subject invention and are actuated thereby to be extended to engage the length of cut pipe after the pipe has been raised by the piston and cylinder assemblies 56, and 55 if desired, following the cut-off operation to eject the length of cut pipe onto the uppermost edge of the first inclined table section 232. The cut length of material will roll or slide down the first inclined table section 232 and come to rest against other previously cut lengths, as shown in FIGS. 10 and 11.

The reciprocating stop and ejector device 238 is lowered in response to a signal from the automatic control system of the present invention and a single piece of cut pipe rolls onto the top portion of the reciprocating member 240, as shown in FIG. 11. The pneumatic piston and cylinder assembly 242 is then energized after a predetermined time delay period and a single piece of pipe is raised to the level of the edge of the second inclined table section 234, as seen in FIG. 12, where the single piece of pipe rolls down the inclined table section 234 and the top surface of clamping jaws 92 onto the extended support piston and cylinders 97. The pneumatic piston and cylinder assemblies 97 are then retracted to lower the piece of pipe to be threaded into the clamping jaws 92 and 94, at which time the pneumatic cylinders 93 are actuated by the automatic control system to clamp the piece of pipe 12 between the clamping jaws 92 and 94, as shown in FIG. 4.

The third conveyor section 206 consists of two inclined table sections 233 and 235 constructed in the same manner as the inclined table sections 232 and 234 of the second conveyor section 204, shown in FIGS. 10 and 11. The first table section 233 of the third conveyor section 206 has its uppermost edge positioned at the same level as and adjacent to the lowermost edge of the inclined top surface of clamping jaw 94, which extends beyond the power head units 62. The lower edge of the second table section 235 is positioned adjacent the rollers 211 of a longitudinal feed conveyor section 242 that is axially aligned with the pipe clamping and chuck assembly 142 and fitting clamping head assembly 143 of the automatic fitting make-on machine assembly 60.

The third conveyor section 206 also incorporates a pair of reciprocating stop and ejector devices 239 constructed in the same manner as the reciprocating stop and ejector devices 238 of the second conveyor section 204, as shown in FIGS. 1, 11 and 12. The previous description of the reciprocating stop and ejector devices 238 of the second conveyor section 204 will also apply to the corresponding elements of the third conveyor section 206, namely, the angled member 241 and pneumatically actuated piston and cylinder assemblies 243 positioned in selected aligned slots 245 of the first and second inclined table sections 233 and 235 of the third conveyor section 206.

The pneumatic piston and cylinder assemblies 92 and 94 mounted on the automatic threading machine assembly 60 also form a part of the third conveyor section 206 and operate in a manner similar to that described above with regard to the pneumatic piston and cylinder assemblies 56 and 57 of the second conveyor section 204. The pneumatic piston and cylinder assemblies 97 support the threaded pipe after the clamping jaws 92 and 94 are released and are actuated by the control system of the subject invention to be extended to raise the threaded piece of pipe 12 to the level of the top surface of the clamping jaws 94, as best seen in FIG. 4, at which time the inclined piston and cylinder assemblies 98 are actuated to eject the threaded piece of material 12 onto the first table section 233 of the third conveyor assembly section 206.

Referring now to FIGS. 1 and 13, the feed conveyor section 242 is constructed in the same manner as the feed conveyor section of the first conveyor section 202 shown in FIG. 13 for feeding pieces of elongated material into the automatic cut-off machine assembly 20, as was described previously. The feed conveyor section 242 includes a plurality of rollers 211 rotatably mounted on a support base member 208 and are driven by a variable sped electric motor 217 in the same manner as described above with regard to the feed conveyor of the first conveyor section 202 shown in FIG. 13.

Referring now to FIG. 8, a pipe feed roll assembly 244 is mounted on the support plate 246 movably mounted on ways 248 and which supports the pipe clamping and centering jaw assembly 142 and the fitting, feeding and clamping head assembly 143, as described above. The detailed construction of the feed roll assembly 244 of the third conveyor section 206 is the same as described above with regard to the material feed roll assembly 220 of the first conveyor section 202 for automatically feeding lengths of material into the automatic cut-off machine assembly. Again, as described previously with regard to the feed roll assembly 220 on the first conveyor section 202, although shown in the preferred embodiment as being mounted on support plate 246 and movable on guide ways 248 in conjunction with the clamping and centering jaw assembly 143, the feed roll assembly 244 of the third conveyor section 206 can also be mounted on support base member 209 of the feed conveyor section 242 at the end positioned adjacent the automatic chuck assembly 142 and fitting clamping head and feeding assemblies 143 and 144.

Automatic Control System

The control system for automatically controlling the operation of the three machine assembly according to the present invention will now be described. The control system of the present invention includes a plurality of motor control devices referred to hereinafter as preset indexers. However, a single preset indexer having separate control circuits for each D.C. synchronous stepping motor can also be used without varying from the scope of the present invention. Each of the control circuits of the single preset indexer can be controlled by a tape control device or computer. The general operational diagram of one such typical preset indexer 300 is shown in FIG. 17 for controlling a D.C. synchronous stepping motor M in response to an input signal into the preset indexer through an index start command means 302 shown schematically as a switch. Actuation of the index start command means 302 may be accomplished manually by a simple switching device or automatically through a numerical control tape device or computer means. The index start command means 302 operates in combination with decade counters 304 to initiate a signal into a control gate 306. The control gate 306 transmits a control signal in response to the input signal from the decade counters 304 and index start command means 302 to activate a pulse gate 308, which may be in the form of an AND switch arrangement. An adjustable oscillator 310 transmits an input signal into the pulse gate 308 which is switched in response to a particular signal or signals from the control gate 306 to actuate a translator logic circuit 312 to cause the D.C. synchronous stepping motor M to step a predetermined number of times to position the various elements of the particular mechanism being actuated at a predetermined point. The output of the pulse gate 308 is also transmitted to the decade counter or counters 304 to control the overall preset indexer circuit to shut the circuit off when the predetermined number of steps have been taken by the D.C. synchronous stepping motor M.

The same general preset indexer logic circuit is used to drive each of the D.C. synchronous stepping motors 38 in the cut-off and chamfering machine assembly 20 and the D.C. synchronous stepping motor 84 in the automatic clamping and threading machine station 40 as well as the small D.C. synchronous stepping motor 128 for automatically adjusting the position of the dies 114 in the automatically adjustable die head assembly 110. The major difference between the operation of each of the preset indexers resides in the manner in which the index start command or switch 302 is actuated and the manner in which decade counters 304 are adjusted or controlled.

The index start command means 302 for controlling the first preset indexer operatively connected with the D.C. synchronous stepping motor 38 for operating the traversing drive assembly of the cut-off and chamfering machine assembly 20 is first actuated, with a signal then being supplied by the decade counters 304 corresponding to a predetermined length of pipe which is to be cut by the cut-off and chamfering machine station 20. The control of the decade counter 304 may be done manually by actuating certain switches or automatically by a numerical control tape or computer device.

Actuation of a main power switch 400, shown in FIG. 18, starts the electric drive motor 216 on the first conveyor section 202 to cause a piece of pipe to be moved in a longitudinal direction along the first conveyor section 202 until the end of the pipe or piece of elongated material contacts the upstanding reciprocating portion 153 of the retractable pipe stop 149. A first sensing means $S_1$, in the form of a microswitch or similar type device, is mounted on the reciprocating portion 153 of the reciprocable pipe stop 149, shown in FIG. 9, to sense the presence of the end of a piece of material to be cut. When the end of a piece of material to be cut actuates sensor $S_1$, the sensor sends a signal to a relay mechanism which actuates an electrically controlled air valve controlling the supply of pneumatic pressure to the piston and cylinder assemblies 226 to actuate the pneumatic piston and cylinder assemblies 226 to lower roller 222. However, the piston and cylinder assemblies 226 are not actuated until a signal has been received from the first preset indexer indicating that the supporting stop assembly 26 and the cut-off and chamfering drive head assembly 28 are set at the predetermined positions required to obtain the length to which the piece of material 12 is to be cut. When both signals are received, the pneumatic piston and cylinder assemblies 226 are actuated to lower roller 222 and the reciprocable portion 153 of the stop assembly 149. Since the drive rolls 210 of the first feed conveyor section 202 are being continuously driven by means of the electric drive motor 216 through the belt 212, when the reciprocable portion 153 of the pipe stop 149 is lowered, a piece of pipe or elongated material 12 is fed into the feed roll assembly 220, where the pipe is engaged by rollers 222 and 228 and fed through the spindle 48, the clamping and centering jaw assembly 46 and the cut-off section 23 of the cut-off and chamfering head assembly 28 until the end of the piece of elongated material 12 comes to rest on or against the support portion 27 of the material supporting stop assembly 26.

Figure 14:
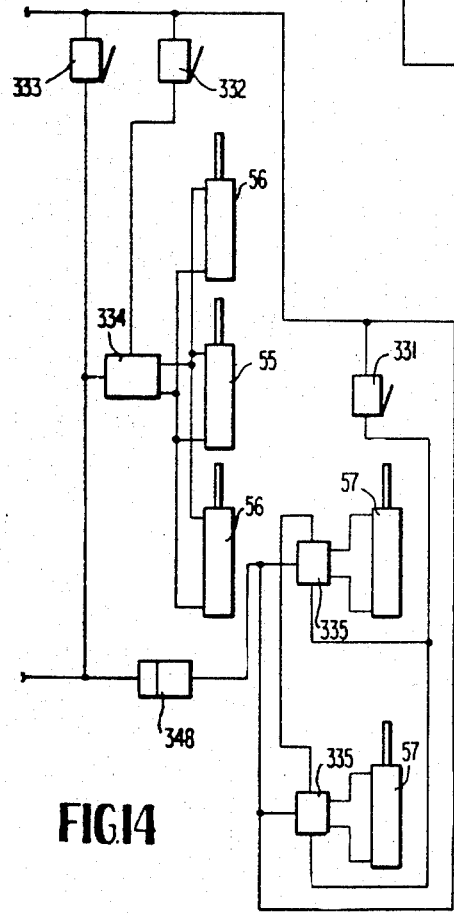
FIG. 14 is a schematic drawing of a portion of the automatic control system relating to the automatic cut-off machine station.

The signal from the first sensing means $S_1$ is also used to actuate an electric air switch 332 to activate the pilot on an air valve 334, as shown in FIG. 14, to extend the support piston and cylinder assemblies 55 and 56 to provide support for the material being conveyed into the cut-off machine assembly 20.

A second pressure sensing means $S_2$, operatively connected to the support element 27 of the supporting stop assembly 26, senses the engagement of the end of the piece of material 12 with the support member 27 and sends a signal to actuate the electric solenoid controlled air valve for supplying air pressure to pneumatic piston and cylinder assemblies 226 to raise the roller 222 off of the pipe 12 and to simultaneously stop electric motor 229. If desired, an electrically operated clutch and brake assembly may be used to disengage the drive motor 229 from the drive belt 230, rather than starting and stopping the electric motor each time in response to the signals from the sensors. The signal from second sensing means $S_2$ is also used to actuate another electrically controlled pneumatic valve to actuate the pneumatic clamping means rotatably mounted within the clamping and centering jaw assembly 46 to clamp the pipe therein, to switch the electric switch 332 of FIG. 14 to actuate the air valve 334 to lower the support piston and cylinder assemblies 55 and 56, and to initiate operation of the gear motor 50 to drive spindle 48 through gear train 52 to rotate the clamped pipe. The signal from the second sensing means $S_2$ is also used to actuate the rotary actuator 29, which may be either electrically or pneumatically driven, to cause the cam member (not shown) within the housing of the cut-off section 23 to rotate to move the cut-off blades 25 radially inwardly to cut the rotating material.

A third sensor $S_3$ mounted within the housing of the cut-off section 23 senses the completion of the cut to stop the rotary actuator 29 and the gear motor 50 and to actuate the electrically operated air valve to release the pneumatic cylinders controlling the clamping and centering jaws 31 to release the pipe. The third sensing means $S_3$ may be in the form of a microswitch mounted on one of the cut-off blades 25 and is actuated when the cut-off blades overlap at the end of a cutting operation. At this time, the signal from sensing means $S_3$ is also sent to the first preset indexer controlling the D.C. synchronous stepping motor 38 to initiate operation thereof in the reverse direction to move the supporting stop assembly 26 and the cut-off power head assembly 28 longitudinally outwardly away from each other a predetermined distance on the hardened and ground ways 24 so that they will be clear of the ends of the cut piece of material.

Referring to FIG. 14, the signal from sensing means $S_3$ also actuates an air switch 333 which actuates the pilot on pneumatic valve 334 to apply pneumatic pressure to pneumatic piston and cylinder assemblies 55 and 56 to raise support plates attached thereto for supporting the length of cut material while the support stop assembly 26 and cut-off head assembly 28 are moved away from the ends of the cut piece. The signal from air switch 333 also activates a time delay relay 348 to allow a preset length of time to pass, after which the time delay relay 348 actuates the pilots on pneumatic valves 335 to apply pneumatic pressure to the pneumatic piston and cylinder assemblies 57 angularly mounted on the supporting stop assembly 26 and cut-off power head unit 28 to engage the cut length of pipe 12 and force the cut length of pipe onto the first inclined table section 232 of the second conveyor section 204, where the cut length of pipe or material rolls down the inclined surface and abuts a vertical wall portion of the second inclined table section 234 or against other previously cut pieces of pipe resting thereagainst, as seen in FIGS. 10 and 11. When the piston and cylinder assemblies 57 reach the outer limit of their stroke, another electric switch 331 operatively connected to the piston and cylinder assemblies 57 is actuated to switch the pilots on valves 335 to retract the piston and cylinder assemblies 57.

As shown in FIG. 10, the vertical edge portion of the second inclined table section 234 of the second conveyor section 204 has a plurality of diameter sensing means $S_4$ mounted thereon. These diameter sensing means $S_4$ may be comprised of a plurality of microswitches spaced vertically along the vertical flange at positions corresponding to the tangential points of varying diameters of pipe. For example, the lowermost sensor may correspond to 1 inch diameter pipe and will be actuated when a piece of 1-inch diameter pipe rolls there against. Thus, a piece of pipe will contact only a single point along a vertical line and will therefore actuate only a single microswitch sensor corresponding to that particular diameter. The signal from the particular switch of sensor $S_4$ which is actuated is sent to a second preset indexer operatively connected to the small D.C. synchronous stepping motor 128 mounted on the automatically adjustable die head assembly 110. The sensing means $S_4$ performs the function of both the switch 302 and decade counter 304 of the preset indexer 300 schematically shown in FIG. 17. The second preset indexer causes the D. C. synchronous stepping motor 128 to step a predetermined number of counts, depending upon which switch of sensor $S_4$ is actuated, with the stepping of the D.C. synchronous stepping motor 128 causing gear 122 to rotate in engagement with gear teeth 124 in the opening 126 of the housing member 112. As stated above with regard to the description of the structure of the automatically adjustable die head assembly 110, by positioning the shaft 120 by the rotating gear 122, the threading dies can be set to correspond to the diameter of pipe to be threaded.

The second preset indexer for controlling the D.C. synchronous stepping motor 128 is capable of adding and subtracting the counts necessary to obtain the new desired positioning of the die moving linkage pieces, as is possible with the other preset indexers used in the control system of the subject invention. Thus, the dies 114 in the die head assembly 110 can be automatically adjusted to the diameter of the next piece of pipe to be threaded, thereby eliminating the need to manually adjust the threading die head each time a different diameter piece of pipe is to be threaded.

A fifth set of sensors $S_5$ are located on the clamping jaws 92 of the automatic clamping and leveling means 74 and spaced a predetermined distance therefrom, as shown in FIG. 3. The fifth set of sensors $S_5$ are positioned away from the clamping jaws 92 a distance equal to the distance the ends of the cut lengths of material are to extend out of the clamping means 74. A pneumatically actuated reciprocable pipe stop 182 is mounted on each of the clamping and leveling means 74, as shown in FIGS. 2 and 3. The fifth sensing means $S_5$ and reciprocable pipe stops 182 are mounted on the clamping jaws 92 outwardly from the centerline of the automatic threading machine assembly 49 a distance sufficient to project beyond the power head units 62 to contact and hold a piece of pipe or cut material that is longer than the previous preset distance between the power head units 62.

The sensors $S_5$ are actuated when contacted by a piece of pipe being conveyed down the second inclined table 234 of the second conveyor section 204 onto the top surfaces of jaws 92 to send a signal to a third preset indexer 330, shown in FIG. 18, which is operatively connected with the D.C. synchronous stepping motor 84 for driving the ball bearing screw mechanisms 78 and 80 through differential unit 86 to move the power head units 62 away from each other until the end of the length of pipe clears the sensor means $S_5$. When the sensing means $S_5$ are cleared, the third preset indexer 330 deenergizes the D.C. synchronous stepping motor 84.

The electrically actuated clutches 88 operatively connected between the ball screw mechanisms 76 and 78 and the differential drive unit 86 are also operatively connected with the sensing means $S_5$ located on the clamping jaw 92 mounted on the carriage to which the particular ball screw drive mechanism is connected. When a piece of pipe engages either one or both of the sensing means $S_5$, a signal is sent to the third preset indexer 330 to actuate the D.C. synchronous stepping motor 84 and engage the corresponding electric clutch 88 to drive the head on which the actuated sensing means $S_5$ is located outwardly until the sensing means $S_5$ moves clear of the end of the piece of pipe, at which time the signal to the third preset indexer 330 is discontinued and the D.C. synchronous stepping motor 84 is de-energized. The signal from the third preset indexer which de-energizes the D.C. synchronous stepping motor 84 also actuates a pneumatic valve to supply air pressure to the reciprocable pipe stops 182 to cause the stops to be lowered and allow the piece of cut material to move onto the supporting piston and cylinder assemblies 97 in the clamping and leveling means 74.

Figure 15:
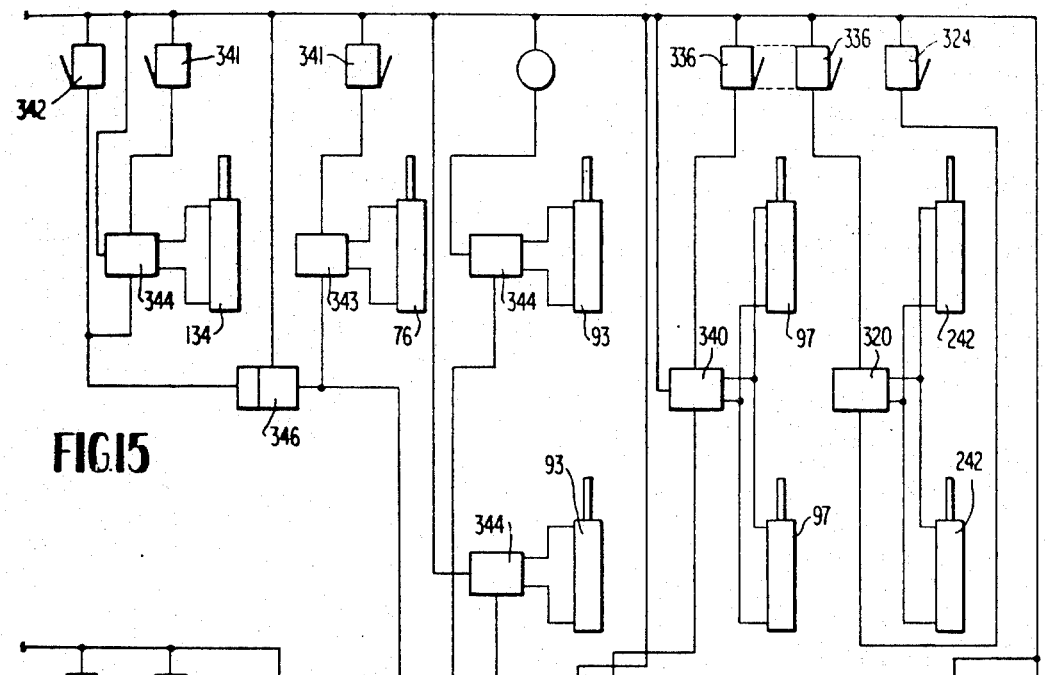
FIG. 15 is a schematic drawing of a portion of the automatic control system relating to the automatic clamping and threading machine station.

Referring now to FIG. 15, when the positioning of the power head units 84 has been completed in response to the signals from sensing means $S_5$, which may be in the form of an air switch or electric microswitch, the pipe being placed on the support piston and cylinder assemblies 97 actuates an air switch 336 operatively mounted on the piston and cylinder assemblies 97 which activates the pilot on an air valve 338 to return the piston and cylinder 242 of the reciprocable ejector devices 238 to their retracted position. This same air switch 336 also activates the pilot on another valve 340 which controls the vertical ejection and support cylinders 97 and causes them to lower the pipe into the clamping jaws 92 and 94. At this point another air switch 341 is tripped when the piston and cylinder assemblies 97 are lowered, which in turn causes the pilots on valves 343 and 344 to switch and apply pneumatic pressure to the head travel cylinders 76 and the clamping cylinders 93 to advance the threading die power head units 62 on the second set of hardened and ground guideways 70 to cause the threading dies 114 of the automatically adjustable diehead assembly 110 to engage the ends of the piece of pipe and simultaneously actuate the clamping jaws 92 and 94 to securely hold the pipe while the threading operation is being performed.

When the automatic threading die head assembly 110 contacts the end of the piece of pipe, a sixth contact sensing means $S_6$ operatively mounted on the front portion of the automatic die head assemblies 110, as shown in FIG. 6, will transmit a signal to the motor controllers 400 for the D.C. drive motors 100, shown in FIG. 18, for driving the spindles 102 to perform the threading operation on the end of the piece of pipe. The threading dies 114 will advance onto the ends of the pipe and pull the power head units 62 therealong on the second set of hardened and ground ways 70, since the pneumatic piston and cylinder assemblies 76 will have both ports exhausted. The threading operation will continue for either a prescribed length of time or until sensing means $S_7$, located within the housing member 112 of the automatically adjustable die head assembly 110, as shown in the cutaway portion of FIG. 6, is actuated by the threaded end of the pipe when the desired lengths of threads have been completed. After the dies 114 have completed the threads, sensing means $S_7$ will actuate an air switch 342 in FIG. 15 and simultaneously send a signal to the motor controllers 400 to disconnect the power thereto.

The air switch 342 activates the pilot on air valve 344 which extends the die head piston and cylinder assemblies 134 and pulses a time delay valve 346 which, when timed, out activates the pilot valves 343 and 344 which cause the piston and cylinder assemblies 93 to unclamp the pipe and the piston and cylinder assemblies 76 to return the power head units 62. The pulse from time delay valve 346 is also sent to a second time delay valve 347, which, when timed out, activates the pilot on valve 340 and starts the timing out of a third time delay valve 349. Valve 340 causes cylinders 97 to raise the pipe out of the clamping jaws 92 and 94, at which time, time delay 349 has timed out and activates the pilots of valves 345 which move the horizontal ejection piston and cylinder assemblies 98 forward to push the pipe from the threading machine clamping jaws 92 and 94 and onto the top surface of jaws 94, where the threaded piece rolls down the inclined surface onto the first inclined table section 233 of the third conveyor section 206. The construction of the inclined table portions and reciprocating stop and ejector device of the third conveyor section 206 is the same as that of the second conveyor section 204, as illustrated in FIGS. 10 and 11, as was described previously. Piston and cylinder assemblies 98 are retracted by activating valve 337 on the extension of these assemblies, thereby completing the cycle.

The above-described construction and operation occurs after the first piece of cut pipe has been threaded. However, on the initial start-up, the operation is initiated by a signal from the third preset indexer 330. The third preset indexer 330 sends a signal to actuate the pilot on valve 326 which in turn extends the escapement piston and cylinder assemblies 242 to feed one piece of pipe into the machine as previously described. These escapement cylinders are returned to their original position when air switch 324 is activated. Switch 324 is activated when the piston and cylinder assemblies 242 reach the end of their stroke.

Figure 16:
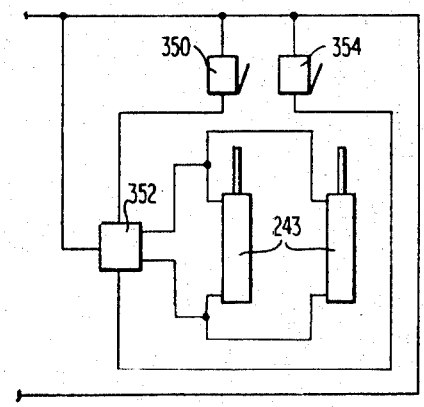
FIG. 16 is a schematic drawing of a portion of the automatic control system relating to the third conveyor section.

Referring now to FIG. 16 which discloses the pneumatic control circuitry for controlling the piston and cylinder assemblies 243 of the reciprocating stop and ejector means 239 of the third conveyor section 206, a first air switch 35k is actuated by the microswitch mounted on the reciprocable member 180 of the pipe stop assembly of the automatic make-on machine assembly 60, described previously, to actuate the pilot on air valves 352 to extend the piston and cylinder assemblies 243 to convey a piece of threaded pipe onto the conveyor assembly 242 of the third conveyor section 206. When the angled member 241 of the reciprocating stop and ejector device 239 reaches the top position and the piece of threaded pipe passes onto the second inclined table section 235, a second air switch 354 is actuated to control the pilot on air valve 352 to retract the piston and cylinder assemblies 243. Thus, upon the completion of the attachment of a fitting to a piece of threaded pipe, an additional piece of threaded pipe is automatically conveyed into the automatic make-on machine assembly 60. Upon initial start-up of the machine, when the first piece of pipe has been ejected from the automatic threading machine station 40, the air switch 350 may be actuated manually from an operator console to initiate the operation of the third conveyor section 206 and the automatic make-on machine assembly 60.

In addition to the above-discussed sensing means and control for the automatic control system of the present invention, two additional sensing means $S_8$ and $S_9$ are mounted on each of the first inclined table sections 232 of the second conveyor section 204 and 233 of the third conveyor section 206 to sense the accumulation of pipe thereon. The material sensing means $S_8$ and $S_9$ may be in the form of microswitches positioned near the highest edge of the first inclined table sections 232 and 233, as shown in FIG. 1. The material sensing means $S_8$ mounted on the second conveyor section 204 is operatively connected with the first preset indexer and control mechanism for the automatic cut-off machine assembly 20 to deactivate the automatic cut-off machine assembly 20 and prevent a further build-up of cut pieces of material on the first inclined table section 232 of the second conveyor section 204 when the material sensing means $S_8$ is actuated. As the pieces of cut material stored on the first inclined table section 232 of the second conveyor section 204 are conveyed through the automatic clamping and threading machine 40, the sensing means $S_8$ is deactivated, thereby allowing the automatic cut-off station 20 to continue cutting pieces of material to predetermined lengths.

The material sensing means $S_9$ mounted on the first inclined table section 233 of the third conveyor section 206 is connected to the automatic control circuit for controlling the automatic clamping and threading machine assembly 40 for deactivating the automatic clamping and threading machine assembly 40 when a build-up of threaded pieces of material on the first inclined table section 232 of the third conveyor means 206 actuates the material sensing means $S_9$. By providing the interrelated sensing and control means for the three machine stations, each of the stations may perform the required subsequent operation on a piece of material without requiring an operator to be present to monitor the flow of material through the machine assemblies.

Referring now to FIG. 18, which shows a schematic of one type of motor control circuit which may be used by the automatic clamping and threading machine assembly 40 when the automatic clamping and threading machine assembly 40 is being used independently of the other machines, as well as in conjunction therewith. As discussed previously, a preset indexer 330 is used to control the D.C. synchronous stepping motor 84 to position the power head unit 62 at a predetermined distance from each other. Each of the power head unit drive motors 100, may be controlled by a motor controller 401, such as a Morse series NA 300 adjustable speed control having a remote station control 402 positioned at an operator's console. Each of the remote station controls 402 contains a speed control potentiometer, power indicating light, "stop" push-button, "forward" push-button, "reverse" push-button, and "run/jog"b switch.

In addition to the motors 100 and the controllers therefor, cutting fluid supply pumps are provided for each power head unit 62, with each pump being driven by a separate motor 404. Each of the pump motors 404 are also controlled by separate motor controllers 406 connected to the power source by main power switch 400. Connected with the motor controllers 406 is a microswitch 408, which senses the position of the power head units 62 relative to the automatic clamping and leveling means 74. When the power head units 62 have been moved toward the automatic clamping and leveling means 74 by the pneumatic piston and cylinder assemblies 76 to initiate a machining operation the microswitch 408 is closed to start the fluid supply pump motors 404. When a machining operation has been completed and the power head units 62 are moved away from the end of the piece of material being machined by the piston and cylinder assemblies 76, the microswitch 408 is disconnected to stop the pump motors 404 and, consequently, the supply of solvent or cutting fluid to the area being machined.

Although the preferred embodiment of the preferred invention has been described as a three machine system, including an automatic control system therefor, it is obvious that each automatic machine assembly could be operated independently, if so desired, or in any desired combination, such as operating the automatic cut-off machine assembly 20 with the automatic clamping and threading machine assembly 40, or the automatic clamping and threading machine assembly 40 with the automatic fitting make-on machine assembly 60, without departing from the scope of the present invention.

I claim:

1. In combination, a first machine for automatically cutting elongated material into pieces of predetermined lengths, a second machine for automatically and simultaneously threading both ends of a cut piece of material, a third machine for automatically attaching a fitting to at least one threaded end of said cut piece of material, and control means for automatically controlling the movement of said material through said machines and for controlling said machines automatically to initiate their respective operations on said material in a predetermined and automatically repeatable sequence.

2. The combination as claimed in claim 1 further comprising an automatic conveying means for transferring said material to said first machine and from said first machine sequentially to said second and third machines in response to said control means.

3. The combination as claimed in claim 1, wherein said second machine comprises a supporting base, at least one guide rail means attached to said supporting base, a first and a second power drive means movably mounted on said guide rail means and in axial alignment with each other, a first and a second threading die head means operatively connected to said first and second power derive means, axial traverse drive means operatively connected with both of said first and second power drive means for moving said first and second power drive means axially relative to each other, and support and clamping means positioned between said first and second threading means, said support and clamping means being operatively connected with said automatic control system for automatically clamping a piece of elongated material between said first and second threading means, said first and second threading means being controlled by said automatic control means for simultaneously threading both ends of a piece of material clamped in said support and clamping means.

4. The combination as claimed in claim 3 wherein said automatic control means comprises cross-sectional dimension sensing means and wherein said first and second threading die means comprises means for automatically adjusting said threading die means radially for accommodating material having varying cross-sectional dimensions, said automatic adjusting means being operatively connected to said automatic control means for operation in response to said cross-sectional dimension sensing means.

5. The combination as claimed in claim 3 further comprising an automatic reaming means drivingly attached to each of said first and second power drive for operation in conjunction with said first and second threading means for reaming an opening in a piece of material simultaneously while threading both ends of said piece of material.

6. The combination as claimed in claim 3 further comprising a first and a second automatic clutch means operatively connected between said axial traverse drive means and each of said first and second power drive means, and a first and a second material length sensing means operatively positioned on said clamping means for sensing the length of material being conveyed to said second machine, said first and second automatic clutch means and said first and second material length sensing means being operatively connected to said automatic control means, said axial traverse drive means being actuated in response to said length sensing means, and said first and second automatic clutch means being selectively engaged and disengaged in response to said first and second material length sensing mans to selectively move said first and second power drive means axially along said guide rail means to accommodate material of varying lengths.

7. The combination as claimed in claim 3 further comprising levelling means positioned between said support and clamping means and said one guide rail means, said levelling means floatingly supporting said clamping means relative to said threading die head means, whereby any misalignment of the material end with said die head due to curvature of the material is substantially compensated by said levelling means.

8. The combination as claimed in claim 7 wherein said levelling means comprises a plurality of springs positioned between a support table and said power actuated clamp, said support table being movably mounted on said one guide rail means.

9. The combination as claimed in claim 4 further comprising a second guide rail means movably mounted on said one guide rail means, each of said first and second power drive means being movable upon separate second guide rail means, both of said second guide rail means being drivingly connected with said axial traverse drive means for movement on said one guide rail means, said support and clamping means comprising a first and a second power actuated clamp mounted for movement with each of said second guide rail means relative to said one guide rail means, and a means for moving said first and second power drive means on said second guide rail means relative to said power actuated clamp mounted therewith, said means for moving said first and second power drive means being operatively connected to said automatic control system, whereby upon the completion of a threading operation said means for moving said first and second power drive means relative to said power actuated clamp mounted therewith is actuated to move said first and second threading means axially away from the end of the piece of material being threaded after said automatically adjustable die heads are moved radially outwardly.

10. The combination as claimed in claim 3 further comprising automatic material ejecting means operatively mounted adjacent said clamping means, said material ejecting means being operatively connected with said automatic control system for automatically ejecting said material upon the completion of a threading operation and the release of said clamping means.

11. The combination as claimed in claim 10 wherein said automatic ejecting means comprises a first pneumatic piston and cylinder assembly operatively positioned below each of said power actuated clamps, and a second pneumatic piston and cylinder assembly positioned adjacent each of said clamping means at an angle with respect to a horizontal plane and extendable in a direction upwardly and angled toward said third fitting attaching machine, said first and second pneumatic piston and cylinder assemblies being operatively connected with said automatic control system and with a source of pneumatic pressure, whereby said first pneumatic piston and cylinder assembly raises the completed threaded piece of material above the power actuated clamps and said second pneumatically actuated piston and cylinder assembly is extended to eject said threaded piece of material in the direction of said third fitting-attaching machine in response to said automatic control system.

12. The combination as claimed in claim 4 wherein said means for automatically adjusting said threading die means comprises a die housing having an opening through the center thereof, a plurality of threading dies mounted within said die housing for radial movement therewithin, one end of each of said dies being positioned within said opening in said housing, linkage means contained within said die housing and being operatively connected with said threading dies for providing radial movement therefor, gear motor drive means mounted on said housing, said gear motor drive means being operatively connected with said linkage means for the actuation thereof, said gear motor drive means being operatively connected with said automatic control means for actuation in response to said cross-sectional dimension sensing means to adjust the radial position of said die heads to the corresponding diameter to be threaded.

13. In combination, a first machine for automatically cutting elongated material into pieces of predetermined lengths, a second machine for automatically performing a machining operation on both ends of a cut piece of material simultaneously, an automatic conveying means for transferring said material to said first machine and from said first machine to said second machine, and control means for automatically controlling the movement of material through said machines and for controlling said machine to automatically initiate their respective operations on said material in a predetermined and automatically repeatable sequence.

14. The combination as claimed in claim 13 wherein said second machine comprises a supporting base, at least one guide rail means attached to said supporting base, a first and a second power drive means movably mounted on said guide rail means and in axial alignment with each other, a first and a second machine tool drive spindle operatively connected to said first and second power drive means, axial traverse drive means operatively connected with both of said first and second power drive means for moving said first and second power drive means axially relative to each other, and supporting and clamping means positioned between said first and second machine tool drive spindles, said supporting and clamping means being operatively connected with said automatic control system for automatically clamping a piece of elongated material between said first and second machine tool drive spindles, said first and second power drive means being controlled by said automatic control means for simultaneously performing a machining operation on both ends of a piece of material clamped in said support and clamping means.

15. The combination as claimed in claim 14 further comprising automatic material ejecting means operatively mounted adjacent said clamping means, said material ejecting means being operatively connected with said automatic control system for automatically ejecting said material upon the completion of a machining operation and the release of said clamping means.

16. In combination, a first machine for automatically threading both ends of a cut piece of material simultaneously, a second machine for automatically attaching a fitting to at least one threaded end of said piece of material, an automatic conveying means for conveying a piece of threaded material from said first machine to said second machine, and a control means for automatically controlling the movement of material through said machines and for controlling said machines to automatically initiate their respective operations on said material in a predetermined and automatically repeatable sequence.

17. The combination as claimed in claim 16 wherein said second machine comprises a supporting base, at least one guide rail means attached to said supporting base, a first and a second power drive means movably mounted on said guide rail means and in axial alignment with each other, a first and a second threading die head means operatively connected to said first and second power drive means, axial traverse drive means operatively connected with both of said first and second power drive means for moving said first and second power drive means axially relative to each other, support and clamping means positioned between said first and second threading means, said support and clamping means being operatively connected with said automatic control system for automatically clamping a piece of elongated material between said first and second threading means, said first and second threading means being controlled by said automatic control means for simultaneously threading both ends of a piece of material clamped in said support and clamping means.

18. The combination as claimed in claim 17 further comprising automatic material ejecting means operatively mounted adjacent said clamping means, said material ejecting means being operatively connected with said automatic control system for automatically ejecting said material upon the completion of a threading operation and the release of said clamping means.

19. An automatically controlled machine assembly for performing machining operations simultaneously on both ends of a single piece of material comprising a supporting base, at least one guide rail means attached to said supporting base, a first and a second power drive means movably mounted on said guide rail means in axial alignment with each other, a first and a second machine tool drive spindle having a machine tool attaching means mounted thereon, said first and second machine tool drive spindles being drivingly connected with said first and second power drive means, respectively, axial traverse drive means operatively connected with both of said first and second power drive means for moving said first and second power drive means axially relative to each other, and support and clamping means positioned between said first and second machine tool drive spindles, said support and clamping means being operatively connected with an automatic control system for automatically clamping a piece of elongated material between said first and second machine tool drive spindles, said first and second power drive means being controlled by said automatic control means for simultaneously performing a machining operation on both ends of a piece of material clamped in said support and clamping means.

20. The machine assembly as claimed in claim 19 further comprising a first and a second automatic clutch means operatively connected between said axial traverse drive means and each of said first and second power drive means, a first and a second material length sensing means operatively positioned on said clamping means for sensing the length of material being placed in said machine, said first and second automatic clutch means and said first and second material length sensing means being operatively connected to said automatic control means, said axial traverse drive means being actuated in response to said length sensing means, and said first and second automatic clutch means being selectively engaged and disengaged in response to said first and second material length sensing means to selectively move said first and second power drive means axially along said guide rail means to accommodate material of varying lengths.

21. The machine as claimed in claim 19 further comprising a second guide rail means movably mounted on said one guide rail means, each of said first and second power drive means being movable upon separate second guide rail means, both of said second guide rail means being drivingly connected with said axial traverse drive means for movement on said one guide rail means, said support and clamping means comprising a first and a second power actuated clamp mounted for movement with each of said second guide rail means relative to said one guide rail means, and a means for moving said first and second power drive means on said second guide rail means relative to said power actuated clamp mounted therewith, said means for moving said first and second power drive means being operatively connected to said automatic control system, whereby upon the completion of a machining operation, said means for moving said first and second power drive means relative to said power actuated clamp mounted therewith is actuated to move said first and second power drive means axially away from the ends of the piece of material on which a machining operation is being performed.

22. The combination as claimed in claim 21 further comprising a levelling means positioned between said support and clamping means and said one guide rail means, said levelling means floatingly supporting said clamping means relative to said machine tool drive spindles whereby any misalignment of the material end with said machine tool drive spindles due to curvature of the material is substantially compensated by said levelling means.

23. The combination as claimed in claim 22 wherein said levelling means is comprised of a plurality of springs positioned between a support table and said power actuated clamp, said support table being movably mounted on said one guide rail means.

24. The combination as claimed in claim 20 further comprising automatic material ejecting means operatively mounted adjacent said clamping means, said material ejecting means being operatively connected with said automatic control system for automatically ejecting said material upon the completion of a machining operation and the release of said clamping means.

25. The combination as claimed in claim 24 wherein said automatic ejecting means comprises a first pneumatic piston and cylinder assembly operatively positioned below each of said power actuated clamps, and a second piston and cylinder assembly positioned adjacent each of said clamping means at an angle with respect to a horizontal plane and extendable in a direction upwardly and angled toward the centerline of said machine assembly, said first and second pneumatic piston and cylinder assemblies being operatively connected with said automatic control system and with a source of pneumatic pressure, whereby said first pneumatic piston and cylinder assembly raises the completed machined piece of material above the power actuated clamps and said second pneumatically actuated piston and cylinder assembly is extended to eject said machined piece of material out of said clamping jaws in response to said automatic control system.

26. The machine as claimed in claim 19 further comprising a first and a second automatically adjustable threading die head means operatively connected to each of said first and second machine tool drive spindles for automatically performing a threading operation on both ends of a single piece of material simultaneously.

27. The combination as claimed in claim 26 further comprising an automatic reaming means drivingly attached to each of said first and second power drive for operation in conjunction with said first and second threading means for reaming an opening in a piece of material simultaneously while threading both ends of said piece of material.

28. The combination as claimed in claim 26 wherein said means for automatically adjusting said threading die means comprises a die housing having an opening through the center thereof, a plurality of threading dies mounted within said die housing for radial movement therewithin, one end of each of said dies being positioned within said opening in said housing, linkage means contained within said die housing and being operatively connected with said threading dies for providing radial movement therefor, a gear motor drive means mounted on said housing, said gear motor drive means being operatively connected with said linkage means for the actuation thereof, said gear motor drive means being operatively connected with said automatic control means for actuation in response to said cross-sectional dimension sensing means to adjust the radial position of said die heads to the corresponding diameter to be threaded.

29. A method of automatically cutting and threading a piece of pipe and automatically attaching a fitting to one end thereof comprising the steps of:
  a. automatically adjusting cutting means in a cut-off machine to cut predetermined lengths of pipe;
  b. automatically conveying pipe into the cut-off machine;
  c. automatically clamping the piece of pipe in the cut-off machine;
  d. rotating the clamped pipe and simultaneously engaging the cutting means with the rotating pipe to perform the cutting operation;
  e. automatically ejecting the cut piece of pipe from the cut-off machine onto a conveying table;
  f. conveying the cut piece of pipe from the conveying table into an automatic clamping and threading machine;
  g. clamping the piece of pipe between clamping jaws positioned at both ends of the pipe;
  h. simultaneously threading both ends of the clamped piece of pipe with independently driven threading dies;
  i. automatically removing the threading dies from the threaded ends of the piece of pipe and releasing the clamping jaws from the threaded piece of pipe;
  j. automatically conveying the threaded piece of pipe to a fitting make-on machine;

k. automatically clamping and rotating the threaded piece of pipe into a fitting clamp in said fitting make-on machine; and l. releasing the pipe after the fitting has been attached and conveying the piece of pipe from the make-on machine to a storage area.

30. The method as claimed in claim 29 further comprising the steps of sensing the diameter of the cut length of pipe while the pipe is being conveyed from the cut-off machine to the automatic threading machine, and automatically adjusting the threading die heads of the automatic threading machine for automatically accommodating pieces of pipe with different diameters.

31. The combination as defined in claim 1 including means for clamping said cut piece of material incident to the threading of said ends.

32. The combination as defined in claim 1 wherein said second machine includes first and second threading die head means for performing said threading of said ends, and means for relatively axially moving said threading die head means thereby threading said ends.

33. The combination as defined in claim 1 wherein said second machine includes first and second threading die head means for performing said threading of said ends, and means for automatically adjusting said threading die head means radially for accommodating material having varying cross-sectional dimensions.

34. The combination as defined in claim 1 including automatic remaining means for reaming an opening in a piece of material simultaneously while threading both ends of said piece of material.

35. The combination as defined in claim 1 including means for sensing the length of material cut by said first machine, said second machine includes first and second threading die head means for performing said threading of said ends, and means responsive to said sensing means for relatively axially moving said threading die head means thereby threading ends of material of varying lengths automatically.

36. The combination as defined in claim 1 wherein said second machine includes first and second threading die head means for performing said threading of said ends, means for relatively axially moving said threading die head means thereby threading said ends, and means for leveling a piece of material between said first and second threading die head means whereby any axial misalignment of the material ends is substantially compensated for by said leveling means.

37. The combination as defined in claim 1 wherein said second machine includes first and second threading die head means for performing said threading of said ends, means for clamping said cut piece of material incident to the threading of said ends, and means for relatively axially moving said threading die head means thereby threading said ends while said cut piece is clamped by said clamping means.

38. The combination as defined in claim 1 wherein said second machine includes first and second threading die head means for performing said threading of said ends, means for automatically adjusting said threading die head means radially for accommodating material having varying cross-sectional dimensions, and means for relatively axially moving said threading die head means thereby threading ends of material having varying cross-sectional dimensions.

39. The combination as defined in claim 1 wherein said second machine includes first and second threading die head means for performing said threading of said ends, means for automatically adjusting said threading die head means radially for accommodating material having varying cross-sectional dimensions, means for sensing the length of material cut by said first machine, and means responsive to said sensing means for relatively axially moving said threading die head means whereby material of varying lengths and cross-sectional dimensions are threaded automatically.

40. The combination as defined in claim 1 wherein said second machine includes first and second threading die head means for performing said threading of said ends, means for leveling a piece of material between said first and second threading die head means whereby any axial misalignment of the material ends is substantially compensated for by said leveling means, means for automatically adjusting said threading die head means radially for accommodating material having varying cross-sectional dimensions, means for sensing the length of material cut by said first machine, and means responsive to said sensing means for relatively axially moving said threading die head means whereby material of varying lengths and cross-sectional dimensions are threaded automatically.

41. The combination as defined in claim 13 including means for clamping said cut piece of material incident to the machining of said ends.

42. The combination as defined in claim 13 wherein said second machine includes first and second die head means for performing said machining of said ends, and means for relatively axially moving said die head means thereby machining said ends.

43. The combination as defined in claim 13 including means for sensing the length of material cut by said first machine, said second machine includes first and second die head means for performing said machining of said ends, and means responsive to said sensing means for relatively axially moving said die head means thereby machining ends of material of varying lengths automatically.

44. The combination as defined in claim 13 wherein said second machine includes first and second die head means for performing said machining of said ends, means for relatively axially moving said die head means thereby machining said ends, and means for leveling a piece of material between said first and second die head means whereby any axial misalignment of the material ends is substantially compensated for by said leveling means.

45. The combination as defined in claim 13 wherein said second machine includes first and second die head means for performing said machining of said ends, means for clamping said cut piece of material incident to the machining of said ends, and means for relatively axially moving said die head means thereby machining said ends while said cut piece is clamped by said clamping means.

46. The combination as defined in claim 13 wherein said machining operation is a threading operation performed by first and second threading die head means for threading of said ends, means for automatically adjusting said threading die head means radially for accommodating material having varying cross-sectional dimensions, means for sensing the length of material cut by said first machine, and means responsive to said sensing means for relatively axially moving said threading die head means whereby material of varying lengths and cross-sectional dimensions are threaded automatically.

47. The combination as defined in claim 13 wherein said machining operation is a threading operation performed by first and second threading die head means for threading of said ends, means for leveling a piece of material between said first and second threading die head means whereby any axial misalignment of the material ends is substantially compensated for by said leveling means, means for automatically adjusting said threading die head means radially for accommodating material having varying cross-sectional dimensions, means for sensing the length of material cut by said first machine, and means responsive to said sensing means for relatively axially moving said threading die head means whereby material of varying lengths and cross-sectional dimensions are threaded automatically.

48. The combination as defined in claim 13 wherein said second machine includes first and second die head means for performing said machining of said ends, means for automatically adjusting said die head means radially for accommodating material having varying cross-sectional dimensions, means for relatively axially moving said die head means thereby machining ends of material having varying cross-sectional dimensions.

49. The combination as defined in claim 13 wherein said second machine includes first and second die head means for performing said machining of said ends, means for automatically adjusting said die head means radially for accommodating material having varying cross-sectional dimensions, means for relatively axially moving said die head means thereby machining ends of material having varying cross-sectional dimensions, and means for automatically attaching a fitting to at least one of said machined ends.

50. The combination as defined in claim 16 including means for clamping said cut piece of material incident to the threading of said ends.

51. The combination as defined in claim 16 wherein said first machine includes first and second threading die head means for performing said threading of said ends, and means for relatively axially moving said threading die head means thereby threading said ends.

52. The combination as defined in claim 16 wherein said first machine includes first and second threading die head means for performing said threading of said ends, and means for automatically adjusting said threading die head means radially for accommodating material having varying cross-sectional dimensions.

53. The combination as defined in claim 16 including automatic remaining means for remaining an opening in a piece of material simultaneously while threading both ends of said piece of material.

54. The combination as defined in claim 16 including means for sensing the length of said cut piece of material, said first machine includes first and second threading die head means for performing said threading of said ends, and means responsive to said sensing means for relatively axially moving said threading die head means thereby threading ends of material of varying length automatically.

55. The combination as defined in claim 16 wherein said first machine includes first and second threading die head means for performing said threading of said ends, means for relatively axially moving said threading die head means thereby threading said ends, and means for leveling a piece of material between said first and second threading die head means whereby any axial misalignment of the material ends is substantially compensated for by said leveling means.

56. The combination as defined in claim 16 wherein said first machine includes first and second threading die head means for performing said threading of said ends, means for clamping a cut piece of material incident to the threading of said ends, and means for relatively axially moving said threading die head means thereby threading said ends while said cut piece is clamped by said clamping means.

57. The combination as defined in claim 16 wherein said first machine includes first and second threading die head means for performing said threading of said ends, means for automatically adjusting said threading die head means radially for accommodating material having varying cross-sectional dimensions, and means for relatively axially moving said threading die head means thereby threading ends of material having varying cross-sectional dimension.

58. The combination as defined in claim 1 wherein said first machine includes first and second threading die head means for performing said threading of said ends, means for automatically adjusting said threading die head means radially for accommodating material having varying cross-sectional dimension, means for sensing the length of a cut piece of material, and means responsive to said sensing means for relatively axially moving said threading die head means whereby material of varying lengths and cross-sectional dimensions are threaded automatically.

59. The combination as defined in claim 1 wherein said first machine includes first and second threading die head means for performing said threading of said ends, means for leveling a piece of material between said first and second threading die head means whereby any axial misalignment of the material ends is substantially compensated for by said leveling means, means for automatically adjusting said threading die head means radially for accommodating material having varying cross-sectional dimensions, means for sensing the length of material cut by said first machine, and means responsive to said sensing means for relatively axially moving said threading die head means whereby material of varying lengths and cross-sectional dimensions are threaded automatically.

* * * * *

UNITED STATES PATENT OFFICE
CERTIFICATE OF CORRECTION

Patent No. 3,720,992          Dated  March 20, 1973

Inventor(s) John W. HYATT

It is certified that error appears in the above-identified patent and that said Letters Patent are hereby corrected as shown below:

In the drawings, Figure 13, page 1 of 7, "20" should read -- 210 --. Column 16, line 65, "sped" should read -- speed --. Column 24, line 19, "b switch" should read -- switch --; Column 24, line 42, "preferred" (second occurrence) should read -- present --. Column 25, line 13, claim 3, "derive" should read -- drive --; Column 25, line 61, "mans" should read -- means --. Column 28, line 38, claim 19, before "in" insert -- and --. Column 31, line 2, claim 29, "clamp" should read -- clamped --; Column 31, line 31, claim 34, "remaining" should read -- reaming --. Column 33, line 55, claim 53, "remaining" (both occurrences) should read -- reaming --.

Signed and sealed this 16th day of July 1974.

(SEAL)
Attest:

McCOY M. GIBSON, JR.
Attesting Officer

C. MARSHALL DANN
Commissioner of Patents